United States Patent [19]

Kong

[11] Patent Number: 5,626,726

[45] Date of Patent: May 6, 1997

[54] METHOD FOR CRACKING HYDROCARBON COMPOSITIONS USING A SUBMERGED REACTIVE PLASMA SYSTEM

[75] Inventor: Peter C. Kong, Idaho Falls, Id.

[73] Assignee: Lockheed Idaho Technologies Company, Idaho Falls, Id.

[21] Appl. No.: 534,602

[22] Filed: Sep. 27, 1995

[51] Int. Cl.$^6$ .................................................. C10G 15/00
[52] U.S. Cl. ............................................................ 204/172
[58] Field of Search .................................... 204/172, 168

[56] References Cited

U.S. PATENT DOCUMENTS

| | | | |
|---|---|---|---|
| 2,018,161 | 10/1935 | Weber | 204/172 |
| 2,878,177 | 3/1959 | Kroepelin et al. | 204/172 |
| 3,607,714 | 9/1971 | Vialaron | 204/172 |
| 4,010,090 | 3/1977 | Fey et al. | 204/172 |

OTHER PUBLICATIONS

Paik, S., et al., "Modeling of a Counterflow Plasma Reactor", *Plasma Chemistry and Plasma Processing*, 11 (2): 229–249 (1991) No month available.

Dilawari, A., et al., "The Temperature Profiles in an Argon Plasma Issuing into an Argon Atmosphere: A Comparison of Measurements Predictions:", *Plasma Chemistry and Plasma Processing*, 10 (2): 321–337 (1990) No month available.

Gladisch, H., "How Huels Makes Acetylene by DC Arc", *Hydrocarbon Processing and Petroleum Refiner*, 41 (6): 159–164 (1962) No month available.

Swain, E., "U.S. Refiners Face Declining Crude Quality, Insufficient Price Spread", *Oil and Gas Journal*, Mar. 1, 1993, pp. 62–65.

Kumar, A., et al., "RESA—A wholly new process for fine oxide powder preparation", *J. Mater. Res.*, 3 (6): 1373–1377 (1988) No month available.

API Refinery Report—Feb. 12, 1993; *Oil and Gas Journal*, (Feb. 12, 1993), p. 73.

Detering, B., et al., "Reduction of Selected Metal Oxides in a Thermal Plasma Produced by a Nontransferred Arc Torch", *Mat. Res. Symp. Proc.*, 98: 359–364 (1987) No month available.

Kong, P., et al., "Thermal Plasma Synthesis of Ceramics—A Review", invited paper, Proc. of ASME 28th Nat. Heat Transfer Conf., Heat Transfer in Thermal Plasma Processing, K. Eternadi (ed.), HTD–13 vol. 161, pp. 1–7 (1991) No month available.

*The Chemistry of Petroleum Hydrocarbons*, Benjamin T. Brooks, et al., (ed.) Reinhold Pub. Corp., New York (1954), pp. 49–62 and 103–274 No month available.

*Organic Chemistry*, Robert T. Morrison, et al., 3rd ed., p. 110, Allyn and Bacon, Inc., Boston, MA (1973) No month available.

*Primary Examiner*—Kathryn Gorgos
*Assistant Examiner*—Kishor Mayekar
*Attorney, Agent, or Firm*—Klaas Law O'Meara & Malkin

[57] ABSTRACT

A method for cracking a liquid hydrocarbon composition (e.g. crude oil) to produce a cracked hydrocarbon product. A liquid hydrocarbon composition is initially provided. An electrical arc is generated directly within the hydrocarbon composition so that the arc is entirely submerged in the composition. Arc generation is preferably accomplished using a primary and secondary electrode each having a first end submerged in the composition. The first ends of the electrodes are separated from each other to form a gap therebetween. An electrical potential is then applied to the electrodes to generate the arc within the gap. A reactive gas is thereafter delivered to the arc which forms a bubble around the arc. Gas delivery may be accomplished by providing a passageway through each electrode and delivering the gas through the passageways. The arc and gas cooperate to produce a plasma which efficiently cracks the hydrocarbon composition.

20 Claims, 6 Drawing Sheets

METHOD FOR CRACKING HYDROCARBON COMPOSITIONS USING A SUBMERGED REACTIVE PLASMA SYSTEM

CONTRACTUAL ORIGIN OF THE INVENTION

The United States Government has rights in this invention disclosed under Contract Number DE-AC07-76ID01570 between the U.S. Department of Energy and EG&G Idaho, Inc., now Contract Number DE-AC07-94ID13223 with Lockheed Idaho Technologies Company.

BACKGROUND OF THE INVENTION

The present invention generally relates to the processing of hydrocarbon compositions for the production of desired organic fractions, and more particularly to a hydrocarbon cracking method which is characterized by a high degree of efficiency, simplicity, insensitivity to contaminants, and versatility.

The processing of hydrocarbon compositions to manufacture lower molecular weight/lower boiling point organic products is commonly known as "cracking". Hydrocarbon cracking processes are widely used in many different technical fields, with particular importance in the petroleum processing industry. In addition, the cracking of hydrocarbon materials is useful in the production of specialty organic chemicals from long-chain (high molecular weight) organic precursor molecules. Regarding the petroleum industry, crude oil contains many valuable hydrocarbon compositions and is a very complex material. As stated in *The Chemistry of Petroleum Hydrocarbons*, Ch. 4, pp. 49–62, Benjamin T. Brooks (ed.), Reinhold Publishing Corp., New York (1954) [which is incorporated herein by reference], most crude oil compositions contain 83–87% by weight carbon, 11–14% by weight hydrogen, and 2–3% by weight elemental oxygen, nitrogen, and sulfur. Crude oil may also contain a variety of trace metals, including but not limited to nickel and vanadium.

Heavy and light crude oil compositions are very complex and typically include dozens of relatively large, high molecular weight $C_5$–$C_{40}$ alkanes, $C_5$–$C_{11}$ cycloalkanes, and $C_6$–$C_{13}$ aromatic hydrocarbons. Exemplary alkanes which are present in typical supplies of crude oil include but are not limited to n-pentane, n-hexane, n-heptane, n-octane, n-nonane, n-decane, and substituted variants of these materials. Representative cycloalkanes include cyclopentane, methylcyclopentane, cyclohexane, methylcyclohexane, ethylcyclopentane, cycloheptane, and others. Finally, representative aromatic hydrocarbon materials which are typically found in crude oil include benzene, toluene, ethylbenzene, p-xylene, m-xylene, o-xylene, naphthalene, and a wide variety of other comparable materials. Little or no $C_1$–$C_4$ compounds are present in most supplies of heavy crude oil. However, the specific chemical composition of crude oil materials will vary based on numerous factors, including the type of oil under consideration and its geographical origin.

As indicated in *The Chemistry of Petroleum Hydrocarbons*, Ch. 4, pp. 49–62, Benjamin T. Brooks (ed.), Reinhold Publishing Corp., New York (1954), crude oils are typically classified by specific gravity or a gravity scale known as "API" gravity established by the American Petroleum Institute. It is generally presumed that the higher the specific or API gravity of a crude oil composition, the more valuable components (e.g. fuel precursor materials) it contains. In particular, higher specific or API gravity values for a given supply of crude oil generally signify a greater amount of gasoline and kerosene components/precursors in the oil. In contrast, lower specific or API gravity levels will generally represent an increased level of heavier, less desirable components and diminished levels of smaller organic molecules which are important in fuel production. Recent studies have shown that, in the past ten years, the API gravity of crude oil materials from sources in the United States has been decreasing by about 0.17% per year, with the sulfur content increasing by about 0.027% per year. As the API gravity of crude oil supplies has decreased, the need for economically viable cracking/processing methods regarding these materials has correspondingly increased. These processing methods should likewise be capable of treating shale oil, tar sands, and other alternative oil compositions as traditional supplies of crude oil become less abundant.

The need for a highly efficient hydrocarbon cracking method is also important in the specialty chemical industry. For example, many high molecular weight organic compounds (e.g. natural products) may be used as precursors (starting materials) for the production of lower molecular weight specialty chemicals. One of example of such a precursor material is a product known as "squalane" or "shark oil". This material is a natural product derived from the tissues/organs of various shark species, and is a very heavy long chain alkane (e.g. $C_{30}H_{62}$). The cracking of this material can yield a wide variety of organic compositions ranging from ethylene to heptadecane. Cracking of long chain, high molecular weight alkanes and other compounds can therefore be used to obtain desired reaction products which may be suitable for numerous applications in the specialty chemical industry as noted above.

Regarding the cracking process in general (which is most often discussed with reference to the treatment of petroleum products), many different procedures may be used as discussed in *Organic Chemistry*, Robert T. Morrison, et al., 3rd ed., p. 110, Allyn and Bacon, Inc., Boston, Mass. (1973). For example, one widely-used cracking method is conventionally known as "thermal cracking". Thermal cracking procedures involve the application of heat to an initial supply of hydrocarbon materials. As a result, alkanes are converted/degraded into alkenes (e.g. ethylene $[C_2H_2]$) and other compositions in lesser amounts (e.g. hydrogen). In another method known as "hydrocracking", a selected hydrocarbon composition is combined with hydrogen within a preferred temperature range of about 250°–450° C. Hydrocracking specifically involves the dissociation of carbon-carbon bonds in the selected hydrocarbon composition, followed by hydrogenation of the dissociated materials to produce desired reaction products of lower molecular weight. "Steam cracking" typically involves the combination of steam with a selected hydrocarbon, followed by the application of heat (e.g. the maintenance of a temperature level of between about 700°–900° C.) and subsequent cooling.

Finally, a process known as "catalytic cracking" is particularly useful in the production of fuel materials (e.g. gasoline., kerosene, and the like). Catalytic cracking processes were first developed in the 1920s–1930s and typically involve placing the selected hydrocarbon composition in contact with a catalyst material (e.g. acid silicate catalysts including but not limited to silica-alumina-nickel and other comparable catalytic agents) at relatively high temperatures (typically between about 350°–600° C.). From a chemical standpoint, catalytic cracking processes basically involve molecular cleavage of the starting hydrocarbons in association with the transfer and addition of hydrogen atoms using a series of carbonium-ion conversion sequences. The resulting cracked products are highly suitable for use in petroleum fuel processing.

Regarding the production of petroleum-based fuels (which is the primary use for hydrocarbon cracking technology), the cracked product will typically include many different low molecular weight compounds including branched alkenes and alkanes. Numerous conventional procedures may be used to separate and isolate desired fractions from a cracked product having multiple components therein. These processes are known in the hydrocarbon processing art and involve (1) distillation in order to separate desired materials by boiling point; (2) solvent extraction processes in which desired fractions are isolated based on differences in polarity and other physical characteristics; (3) crystallization in which various compositions are separated from each other based on different solubility levels; and (4) chromatography which basically involves the separation of desired fractions using differences in adsorption and charge characteristics. Accordingly, many different methods may be used to separate multiple fractions in a cracked hydrocarbon product, with the present invention not being limited to any particular separation processes. Information regarding separation methods for mixtures of cracked hydrocarbon materials are discussed in *The Chemistry of Petroleum Hydrocarbons*, Chs. 7–10, pp. 103–274, Benjamin T. Brooks (ed.), Reinhold Publishing Corp., New York (1954) [which is again incorporated herein by reference].

Notwithstanding the cracking methods described above, a need remains for a highly efficient and versatile cracking process which provides the following benefits: (1) applicability to a wide variety of different petroleum and non-petroleum hydrocarbon compositions (e.g. crude oil, refinery waste products, long chain organic molecules of biological origin, and the like); (2) the avoidance of metal catalytic agents and other comparable reagents; (3) the ability to process and crack hydrocarbon materials in the presence of heavy metals and/or sulfur without loss of effectiveness; (4) the absence of large, complex, and energy-intensive processing equipment; (5) the ability to process hydrocarbon materials in a rapid, continuous, and non-labor-intensive manner with a minimal degree of system maintenance; (6) a lack of chemical solvents and the costs/environmental controls associated therewith; and (7) the use of a processing system with a high degree of simplicity and a minimal number of components which facilitates on-site treatment of hydrocarbon materials at remote locations. The present invention provides all of these benefits in a highly unique manner and represents an advance in the art of hydrocarbon cracking as discussed below.

SUMMARY OF THE INVENTION

It is an object of the present invention to provide a highly efficient method for cracking hydrocarbon compositions (e.g. petroleum fractions and other hydrocarbon materials).

It is another object of the invention to provide a method for cracking hydrocarbon compositions which is readily applicable to a wide variety of structurally different hydrocarbon materials.

It is another object of the invention to provide a method for cracking hydrocarbon compositions which enables the cracking process to be accomplished in a minimal amount of time.

It is another object of the invention to provide a method for cracking hydrocarbon compositions which uses a minimal amount of energy and a reduced number of processing components.

It is another object of the invention to provide a method for cracking hydrocarbon compositions which avoids the use of complex chemical catalysts and organic/inorganic solvents.

It is a further object of the invention to provide a method for cracking hydrocarbon compositions which enables the conversion of materials such as heavy crude oil with a high level of efficiency.

It is a further object of the invention to provide a method for cracking hydrocarbon compositions in which the resulting cracked hydrocarbon product can be used for many purposes including the manufacture of gasoline, diesel, and aviation fuel materials.

It is a further object of the invention to provide a method for cracking hydrocarbon compositions which is capable of treating refinery waste products (e.g. refinery "residuum"), and is relatively unaffected by the presence of heavy metals and/or sulfur in the compositions being processed.

It is a still further object of the invention to provide a method for cracking hydrocarbon compositions in which the above-listed goals are accomplished through the use of a plasma energy conversion system in which an electrical arc is generated directly in the hydrocarbon compositions being treated so that the arc is submerged. Thereafter, a reactive gas is delivered to the arc so that a plasma gas bubble is formed around the arc.

It is an even further object of the invention to provide a method for cracking hydrocarbon compositions using the foregoing plasma energy conversion system in which the electrical arc is generated by the application of an electrical potential to a pair of electrodes each having a first end positioned within the hydrocarbon compositions of interest. The first ends of both electrodes are adjacent to and spaced apart from each other to form a gap in which the electrical arc is allowed to form.

In accordance with the foregoing objects, the present invention involves a highly efficient method for cracking hydrocarbon materials (e.g. petroleum fractions and other organic compositions). The term "cracking" as used herein shall generally involve a chemical process in which selected hydrocarbon materials (e.g. heavy crude oil) are decomposed into chemical fractions having a lower boiling point and/or decreased molecular weight. The claimed method is applicable to a wide variety of materials, and avoids the use of complex, high-maintenance processing equipment. The particular materials which can be cracked in accordance with the invention shall be discussed in greater detail below, along with additional information regarding the steps, procedures, equipment, techniques, and capabilities associated with the present invention.

In accordance with the invention, a supply of a liquid hydrocarbon composition is initially provided. As discussed below, a substantial number of different hydrocarbons may be cracked using the methods of the present invention, including low-grade crude oil, refinery waste products (e.g. refinery "residuum"), and other organic materials. Accordingly, the present invention shall not be limited regarding the particular compositions which can be treated to produce a cracked hydrocarbon product. To crack the liquid hydrocarbon composition, an electrical arc is generated directly within the composition. Specifically, the electrical arc is entirely submerged in the hydrocarbon composition. In a preferred embodiment, the electrical arc will have an AC (alternating current) arc voltage of about 0.5–15.0 kV AC (optimum=about 0.9–1.5 kV AC) and an arc current of about 100–500 mA AC (optimum=about 400–500 mA AC). Alternatively, the electrical arc may involve the use of DC (direct current) energy with an arc voltage which is again about 0.5–15.0 kV DC (optimum= about 0.9–1.5 kV DC) and an arc current of about 100–500 mA (optimum=about 400–500 mA DC). However, the present invention shall not be limited to these numerical parameters (or any of the other numerical parameters stated herein) which are provided herein for example purposes.

In an exemplary and preferred embodiment, the length of the electrical arc will be about 1–3 mm (optimum=about 2 mm), although these values may vary depending on the desired size and capacity of the processing system. Likewise, best results and highest yields are achieved when the average bulk temperature of the liquid hydrocarbon composition is maintained at a level of about 70°–150° F. (optimum=about 100° F.) during the cracking process. Methods for temperature control and the benefits associated with this range will be described in further detail below.

A reactive gas is thereafter delivered to the arc within the hydrocarbon composition so that the gas comes in contact with the arc and forms a plasma bubble surrounding the arc. Delivery of the reactive gas will preferably be accomplished at a gas flow rate of about 0.05–1.0 liter/min. Exemplary gas materials suitable for use in the cracking process will include but not be limited to $CH_4$, $N_2$, $H_2$, CO, $CO_2$, $NH_3$, air, steam, $Br_2$, $Cl_2$, $F_2$, and mixtures thereof. However, the particular reactive gas to be used will depend on a variety of factors (including the specific hydrocarbon compositions being treated and/or the desired compounds to be formed) as determined by preliminary pilot studies. Accordingly, the present invention shall not be exclusively limited to any particular reactive gas materials or specific operating parameters as previously noted.

Regarding the plasma bubble produced from the reactive gas, an exemplary bubble in a small scale reactor system will have a volume of about 1–3 cc, although this volume may be larger, depending on the overall size of the processing system and the arc gap. The gas materials in the bubble (referred to herein as a "plasma bubble") cooperate with the electrical energy generated by the arc to produce a plasma energy conversion system which creates substantial amounts of heat (e.g. thermal energy) and ultraviolet radiation. As a result, the liquid hydrocarbon composition is cracked and, in many cases, hydrogenated to produce a cracked hydrocarbon product. The cracked product can then be processed using conventional distillation methods and other procedures known in the art for the separation of chemical fractions.

The claimed method is highly efficient and is characterized by a high level of cracking efficiency. Likewise, cracking is accomplished using a minimal amount of energy and equipment, with the conversion process taking place in a substantially instantaneous manner. As noted above, best results and highest yields of desired products are achieved when the average bulk temperature of the liquid hydrocarbon composition is maintained at a level of about 70°–150° F. (optimum=about 100° F.) during the cracking process. The maintenance of this temperature level avoids undesired side reactions (such as coke formation) and distillations of the cracked products which may occur at higher temperatures. The term "average bulk temperature" and "average temperature" as used herein shall be deemed equivalent, and will involve the mean temperature of the hydrocarbon composition at all points within the reaction vessel including locations which are directly adjacent the electrical arc, as well as locations remotely spaced from the arc. Methods for temperature control and the benefits associated with the foregoing temperature range will be discussed in greater detail below.

Implementation of the claimed method may be accomplished using a wide variety of different processing systems, components, techniques, materials, and the like. In this regard, the present invention in its broadest sense shall not be limited to any particular processing systems, components, or hardware. However, in a preferred embodiment, the liquid hydrocarbon composition selected for treatment will initially be placed in a containment vessel. An elongate conductive primary electrode is thereafter provided which comprises a first end and a second end. Likewise, an elongate conductive secondary electrode of substantially identical configuration is also provided which includes a first end and a second end. Exemplary materials used to construct the primary and secondary electrodes are selected from the group consisting of elemental Cu, W, Ni, Zr, Co and alloys thereof, brass, stainless steel, a transition metal aluminide, and a transition metal titanide. However, the present invention shall not be limited exclusively to the foregoing materials which are provided for example purposes.

Next, the first end of the primary electrode is positioned in the liquid hydrocarbon composition within the containment vessel so that the first end is entirely submerged therein. The first end of the secondary electrode is also positioned within the liquid hydrocarbon composition in the vessel so that it is submerged in the composition. In addition, the first end of the secondary electrode is placed directly adjacent to and spaced apart from the first end of the primary electrode in order to form a gap between the primary electrode and the secondary electrode. In an exemplary and preferred embodiment involving a small-scale system as described above, the gap (e.g. the distance between the primary and secondary electrodes) will have a length of about 1–3 mm (optimum=about 2 mm). Accordingly, the electrical arc formed within the gap will likewise have an exemplary and preferred length of about 1–3 mm (optimum=about 2 mm) as previously noted. The size of the gap may be greater than the values listed above, depending on the size and desired capacity of the system under consideration. As described in greater detail below, the second ends of the primary and secondary electrodes are positioned outside the containment vessel and hydrocarbon composition.

An electrical potential is then applied to the primary and secondary electrodes at the second ends of the electrodes using a selected power supply. Exemplary power supplies suitable for this purpose will be described below. In a preferred embodiment, the power supply will deliver an electrical potential to the primary electrode and the secondary electrode having a voltage of about 0.5–15.0 kV AC (optimum=about 0.9–1.5 kV AC) and a current of about 100–500 mA (optimum=about 400–500 mA AC). If a DC power supply is used, it is preferred that the power supply deliver an electrical potential to the primary electrode and the secondary electrode having a voltage which is likewise about 0.5–15.0 kV DC (optimum=about 0.9–1.5 kV DC) and a current of about 100–500 mA (optimum=about 400–500 mA DC). However, the present invention shall not be limited to these values, with the particular voltage and current levels for each situation depending on the specific hydrocarbon materials being treated as determined by preliminary pilot investigations. It should also be noted that the voltage and current values associated with the electrical potential applied to the primary and secondary electrodes will be equivalent to the arc voltage and current values as indicated above. This relationship exists because of the conductive nature of the electrodes which allows substantially uninterrupted transmission of the electrical potential through the electrodes which is ultimately used to create the electrical arc within the gap.

Thereafter, the reactive gas is delivered to the arc so that it comes in contact therewith and forms a plasma bubble surrounding the arc (having a preferred volume of about 1–3 cc when an arc gap of about 1–3 mm is used as previously stated). Delivery of the gas will preferably be accomplished at a gas flow rate of about 0.05–1.0 liter/min. as noted above. Exemplary gas materials suitable for use in the cracking process will again include but not be limited to $CH_4$, $N_2$, $H_2$, CO, $CO_2$, $NH_3$, air, steam, $Br_2$, $Cl_2$, $F_2$, and mixtures thereof. The gas materials in the plasma bubble cooperate with the electrical energy created by the arc to produce a plasma energy conversion system which generates substantial amounts of heat (e.g. thermal energy) and ultraviolet radiation. This energy enables the liquid hydrocarbon composition to be cracked and, depending on the circumstances, hydrogenated to produce a cracked hydrocarbon product as earlier stated.

Finally, a number of different methods may be used to deliver the reactive gas to the electrical arc so that plasma bubble formation may occur. In a preferred embodiment, the primary and secondary electrodes will each have open first and second ends. As a result, the primary and secondary electrodes are tubular in configuration. In this regard, the primary electrode will have at least one gas flow passageway extending continuously through the electrode from the first end to the second end. The secondary electrode will also have at least one gas flow passageway extending continuously through the electrode from the first end to the second end. The first end of the primary electrode will be positioned within the hydrocarbon composition in the containment vessel so that the first end is entirely submerged in the composition. The second end of the primary electrode will be positioned outside the containment vessel. Likewise, the first end of the secondary electrode will be positioned within the hydrocarbon composition in the containment vessel so that the first end is entirely submerged in the composition. The second end of the secondary electrode will be positioned outside the containment vessel. As previously indicated, the first end of the secondary electrode will be located directly adjacent to and spaced apart from the first end of the primary electrode in order to from the gap between these components.

To supply the electrodes with the reactive gas, the gas is delivered into the passageway through the primary electrode and into the passageway through the secondary electrode. In a preferred embodiment, gas delivery is initiated at the open second ends of each electrode which are positioned outside the containment vessel. As a result, the gas passes out of the electrodes through the open first ends of each electrode. The gas thereafter enters the gap between the electrodes and comes in contact with the electrical arc in order to form the plasma bubble. The remaining parameters associated with this embodiment of the invention (e.g. including plasma bubble size, etc.) will be substantially the same as previously indicated.

In an alternative embodiment, the primary and secondary electrodes do not have first and second ends which are open, and likewise do not include any gas flow passageways through the electrodes. Gas delivery is instead accomplished by the use of separate tubular gas transfer conduits (one for each electrode used in the system) which are not directly connected to the electrodes. Each gas transfer conduit includes an open first end and an open second end. The first end of each conduit is connected to a supply of reactive gas located outside the containment vessel. The second end of each conduit is positioned within the hydrocarbon composition at a location directly adjacent the gap. Specifically, the second end of one conduit is located at one end of the gap (adjacent the primary electrode), with the second end of the other conduit being positioned at the opposite end of the gap (adjacent the secondary electrode). In this manner, the reactive gas is provided to the first end of each conduit, with the gas thereafter travelling through the conduits and passing outwardly into the hydrocarbon composition via the second end of each conduit. After leaving the conduits, the gas comes in contact with the electrical arc between the primary and secondary electrodes in order to form the plasma bubble. The remaining parameters associated with this embodiment (e.g. including the type of reactive gas being used, the voltage and current values associated with the electrical potential applied to the electrodes, the gap length, system operating temperature, plasma bubble size, etc.) will be substantially the same as previously indicated.

The present invention represents an advance in the art of hydrocarbon cracking. The use of a submerged electrical arc in combination with a reactive gas to form a plasma bubble within the hydrocarbon composition provides many advantages and a high degree of production efficiency. In particular, the claimed plasma energy conversion system offers numerous important benefits which are listed above. These benefits, as well as other objects, features, and advantages of the invention shall be described below in the following Brief Description of the Drawings and Detailed Description of Preferred Embodiments.

DETAILED DESCRIPTION OF PREFERRED EMBODIMENTS

The present invention involves a highly efficient method for cracking hydrocarbon compositions in order to produce a cracked hydrocarbon product. The cracked hydrocarbon product will contain one or more hydrocarbon materials having lower molecular weights and/or lower boiling points compared with the initial hydrocarbons of interest. As noted above, the term "cracking" as used herein shall be defined as a process in which the carbon-carbon bonds of selected hydrocarbon materials are disrupted/broken in order to produce lower molecular weight chemical fractions (primarily consisting of branched or straight-chain alkanes, alkenes, alkynes, and/or aromatics). These materials may then be used for a wide variety of purposes ranging from motor fuel production to the manufacture of specialty chemicals. It is important to emphasize that the present invention as described below shall not be limited to any particular hydrocarbon starting materials or any specific hardware associated with the processing methods claimed in this case. While the present invention shall be described herein with primary reference to the processing of crude oil and other petroleum compositions, it is prospectively applicable to many other hydrocarbon materials of both synthetic and natural origin. Likewise, the specific components and production parameters listed below may be varied in accordance with preliminary pilot studies on the particular hydrocarbon compositions being treated. Accordingly, the components and numerical parameters set forth herein represent exemplary embodiments which shall be considered non-limiting regarding the broad concepts of the invention.

Figure 1:
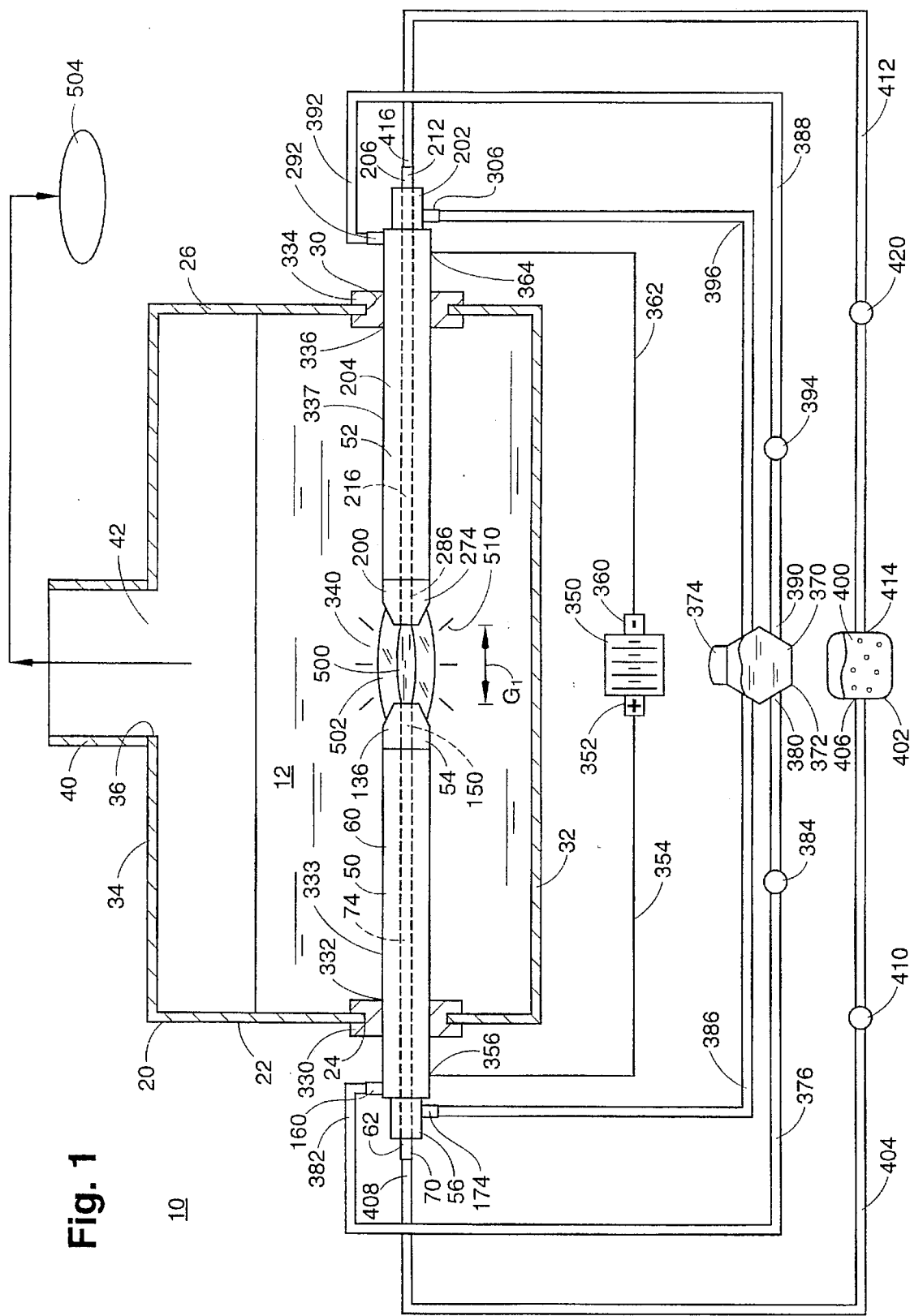
FIG. 1 is a schematic representation (partially in cross-section) of a preferred plasma energy conversion system which may be used to crack liquid hydrocarbon compositions in accordance with the present invention.

In accordance with the present invention, a submerged electrical arc is employed in combination with a reactive gas surrounding the arc to produce a plasma energy conversion system. The claimed system is capable of cracking a wide variety of hydrocarbon materials in a highly efficient and economical manner. With reference to FIG. 1, an exemplary and preferred plasma energy conversion system 10 produced in accordance with the invention is schematically illustrated. The system 10 is provided with a supply of a liquid hydrocarbon composition 12. As noted above, the hydrocarbon composition 12 may involve many different organic materials, with the present invention not being limited to the treatment of any particular compositions. Exemplary liquid hydrocarbon compositions 12 which may be cracked as described below will involve all grades of crude oil (including "heavy" crude oil having an API gravity of 20 or less with a relatively high sulfur content of about 1% by weight or more). As noted above, crude oil is a highly complex, nonuniform mixture of aromatic compounds, aliphatic hydrocarbons, paraffins, and other compositions (e.g. trace metals, sulfur, and the like). Regarding the hydrocarbon compounds which are present in crude oil, such materials typically have between about 5–17 carbon atoms per molecule depending on the particular grade of oil under consideration. In addition, crude oil materials may also include long-chain compounds having more than 17 carbon atoms per molecule. Exemplary hydrocarbons which are present in typical supplies of crude oil include but are not limited to n-pentane, n-hexane, n-heptane, n-octane, n-nonane, n-decane, cyclopentane, methylcyclopentane, cyclohexane, methylcyclohexane, ethylcyclopentane, cycloheptane, benzene, toluene, ethylbenzene, p-xylene, m-xylene, o-xylene, naphthalene, alkylbenzene, and a wide variety of other comparable materials in various forms. The content of a given supply of crude oil will differ based on a variety of factors, including the type of oil under consideration and its geographical origin. It is a benefit and advantage of the present invention that virtually all types of crude oil can be treated (cracked) without a loss of efficiency to produce a cracked product. As discussed below, the cracked product will typically contain substantial amounts of low molecular weight hydrocarbons primarily having about 2–4 carbon atoms per molecule (e.g. methane, ethylene, ethane, propylene, propane, n-butane, and iso-butane). It is a further advantage of the present invention that the claimed process is capable of processing crude oil grades that were previously considered to be economically inappropriate for treatment purposes using prior cracking methods.

Furthermore, the term "liquid hydrocarbon composition" as used herein shall encompass other forms of crude oil/raw petroleum products which exist in a fluid or semi-fluid (e.g. non-solid) state. Exemplary alternative petroleum products which may be treated in accordance with the invention include but are not limited to tar sand materials, and refinery waste compositions or by-products (e.g. hereinafter collectively known as "refinery residuum"). Refinery residuum typically includes a number of hydrocarbon compositions which remain after the treatment and processing of crude oil in the production of motor fuels. In particular, refinery residuum will normally contain a significant amount of asphaltenes. From a chemical standpoint, asphaltenes basically involve high molecular weight polycyclic aromatic compounds which contain heteroatoms such as nitrogen, oxygen, and trace metals including Ni, V, and Mg. In addition, refinery residuum may also include variable amounts of other components including but not limited to thiophenes (e.g. dibenzothiophene $[C_{11}H_8S]$ and naphthobenzothiophene $[C_{15}H_{10}S]$), nitrogen compounds (e.g. carbazole $[C_{12}H_9N]$), benzocarbazole $[C_{16}H_{11}N]$, and benzoquinoline $[C_{13}H_9N]$), and porphyrins (e.g. $C_{22}H_3(Et)_3(Me)_4N_4VO$ and $C_{20}H_6(Et)_4(Me)_4N_4$).

Finally, the term "liquid hydrocarbon composition" may also encompass high molecular weight aliphatic or aromatic hydrocarbons of natural or synthetic origin which are employed as precursor/starting materials for the production of lower molecular weight compounds. These compounds may ultimately be used for a variety of purposes in the specialty chemicals industry. One example of such a material is a product known as "squalane" or "shark oil". This composition is a natural product which is found in the tissues/organs of various shark species and is a very heavy alkane (e.g. $C_{30}H_{62}$). The cracking of this compound can yield a wide variety of organic compositions ranging from ethylene to heptadecane. Cracking of long-chain, high molecular weight organic alkanes and other compounds can therefore be used to obtain desired reaction products. Other high molecular weight hydrocarbon compositions which can be processed in accordance with the present invention include but are not limited to polycyclic aromatic compounds such as naphthalene $[C_{10}H_8]$ and phenanthrene $[C_{14}H_{10}]$, as well as various long-chain alkanes $[C_nH_{2n+2}]$ and alkenes $[C_nH_{2n}]$.

Cracking of the liquid hydrocarbon composition 12 in accordance with the present invention can be undertaken in many different ways. For example, batch production systems may be used in which separate quantities of the hydrocarbon composition 12 are treated on an individual basis, followed by removal of the cracked product and treatment of the next batch of hydrocarbon composition 12. Alternatively, the hydrocarbon composition 12 may be treated in a continuous system in which the hydrocarbon composition 12 is processed and allowed to flow through the system 10 in an uninterrupted stream with the continuous introduction of new supplies of composition 12. The concepts, components, and procedures described herein are readily applicable to both types of systems.

With continued reference to the system 10 of FIG. 1 which involves a batch processing configuration that is readily converted to continuous operation, the liquid hydrocarbon composition is retained within a containment vessel 20. The containment vessel 20 may be of any size, shape, capacity or general configuration, depending on the amount and type of hydrocarbon composition 12 to be processed. In the embodiment of FIG. 1, the containment vessel 20 includes a first side wall 22 having a circular first opening 24 therein, and a second side wall 26 substantially parallel to the first side wall 22 having a circular second opening 30 therein. As illustrated in FIG. 1, the first opening 24 is in axial alignment with the second opening 30 This particular design configuration will be discussed in greater detail below. The containment vessel 20 further includes an uninterrupted bottom wall 32 and a top wall 34 which is substantially parallel to the bottom wall 32 as illustrated. In the embodiment of FIG. 1, the top wall 34 further includes a third opening 36 therethrough. Operatively connected to the top wall 34 at a position directly over the third opening 36 is an upwardly extending tubular conduit 40. The tubular conduit 40 is connected to the top wall 34 by welding or other conventional attachment processes. The third opening 36 and the tubular conduit 40 collectively function as an outlet port 42 which is used to remove/withdraw cracked (e.g. "light") hydrocarbon products from the system 10. The term "tubular" as used herein shall generally signify an elongate structure having at least one bore or passageway therethrough surrounded by a continuous wall.

Regarding the compositions which are used to produce the containment vessel 20 and associated components (e.g. the tubular conduit 40), the present invention shall not be limited to any particular construction materials for this purpose. However, the selected construction materials should be resistant to corrosion and other forms of chemical deterioration normally caused by hydrocarbon compositions (e.g. petroleum materials). Exemplary and preferred materials which may be used to manufacture the containment vessel 20 in accordance with the present invention include but are not limited to stainless steel, nickel, fused quartz, borosilicate glass, alumina, and polytetrafluoroethylene (e.g. Teflon®). In addition, while the thickness of the walls 22, 26, 32, 34 associated with the containment vessel 20 is not critical, a uniform thickness range of about 0.125–0.25 inches for each of the walls 22, 26, 32, 34 will provide acceptable results in the small-scale exemplary embodiment described herein.

The size of the containment vessel 20 (as well as the final thickness of the walls 22, 26, 32, 34) will vary in view of the desired production capacity of the system 10. In this regard, the vessel 20 may be as large or small as necessary to retain the desired amount of hydrocarbon composition 12 therein. For example, in the exemplary embodiment described herein which involves a small-scale pilot system, the capacity of the vessel 20 will range from about 0.5–5.0 gallons. Regardless of the capacity of the containment vessel 20, it is preferred that the vessel 20 be ½ to ¾ filled with the selected liquid hydrocarbon composition 12 during treatment.

Cracking of the hydrocarbon composition 12 in accordance with the present invention shall involve the generation of an electrical arc directly within the composition 12 so that the arc is entirely submerged in the composition 12. Thereafter, a reactive gas is delivered to the arc so that the gas comes in contact therewith and forms a bubble (e.g. a "plasma bubble") which surrounds the arc. These aspects of the invention will be described in further detail below. Many different methods and components may be used to form the electrical arc within the hydrocarbon composition 12, and the present invention shall not be limited to any particular arc generation methods. However, a preferred method for producing the arc is schematically illustrated in FIG. 1.

With reference to FIG. 1, the electrical arc is generated using a plurality of electrodes, with each electrode having at least one portion positioned directly within the hydrocarbon composition 12 inside the containment vessel 20. Specifically, an elongate conductive primary electrode 50 and an elongate conductive secondary electrode 52 are provided as shown in FIG. 1. Both of the electrodes 50, 52 are manufactured from a selected metal as described below.

Figure 3:
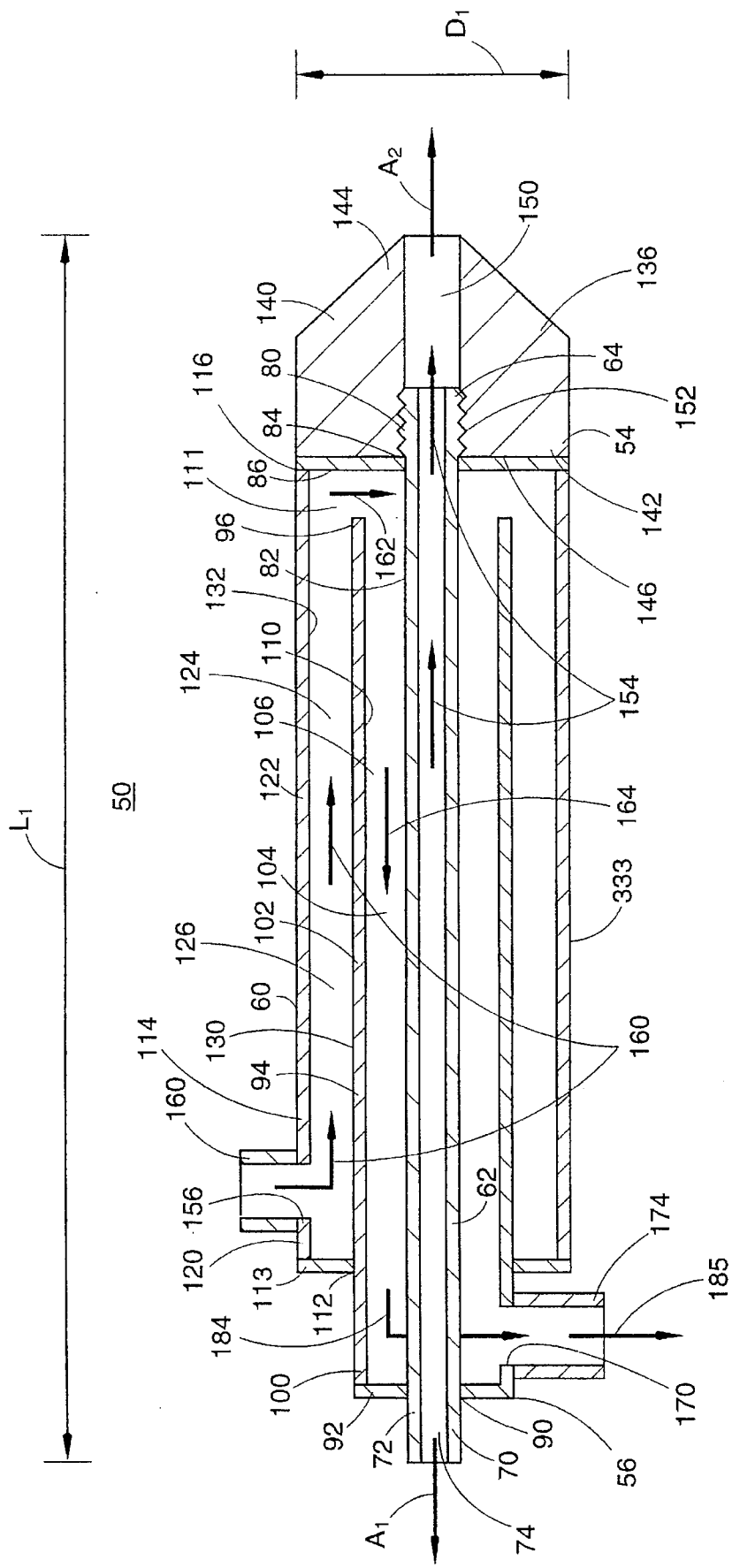
FIG. 3 is an enlarged schematic cross-sectional view of a representative primary electrode which is suitable for use in the system of FIG. 1.

The primary electrode 50 (FIG. 3) specifically includes a first end 54, a second end 56, and a medial portion 60 between the first and second ends 54, 56. In a preferred embodiment, the medial portion 60 is comprised of a nested, concentric arrangement of elongate tubular members. The tubular members (discussed below) form at least one and preferably multiple passageways through the electrode 50. As schematically illustrated in FIG. 3, the medial portion 60 of the electrode 50 specifically includes a tubular inner conduit 62 having an open first end 64 and an open second end 70. The inner conduit 62 further includes a continuous (e.g. uninterrupted) annular side wall 72 which surrounds and defines a central gas flow passageway 74 through the inner conduit 62. The function of the gas flow passageway 74 will be discussed in greater detail below. As shown in FIG. 3, the gas flow passageway 74 has a central longitudinal axis $A_1$.

The first end 64 of the inner conduit 62 further includes an externally threaded region 80 on the exterior surface 82 of the side wall 72. The first end 64 of the inner conduit 62 likewise passes through an opening 84 in a front plate 86 associated with the electrode 50. As a result, the first end 64 extends outwardly from the medial portion 60 of the electrode 50 as illustrated in FIG. 3. Fluid-tight engagement of the first end 64 of the inner conduit 62 within the opening 84 through the front plate 86 is desired and may be accomplished in many ways. For example, conventional welding techniques may be employed to secure the first end 64 to and within the opening 84 through the front plate 86. The second end 70 of the inner conduit 62 passes through an opening 90 in a rear plate 92 (FIG. 3), with the second end 70 extending outwardly therefrom. Fluid-tight engagement of the second end 70 of the inner conduit 62 within the opening 90 of the rear plate 92 is desired and may again be accomplished using conventional welding techniques (or other known attachment methods).

With continued reference to FIG. 3, the primary electrode 50 further includes a tubular middle conduit 94 which is shorter (e.g. by about 10% or more) than the inner conduit 62. The middle conduit 94 has an open first end 96, an open second end 100, and a continuous (e.g. uninterrupted) annular side wall 102 which surrounds and defines an interior region 104 within the conduit 94 (FIG. 3). The inner conduit 62 is nested and centered within the interior region 104 of the middle conduit 94. Likewise, the inner conduit 62 has a diameter which is considerably less (e.g. by about 30% or more) than the diameter of the middle conduit 94. As a result, an annular (e.g. ring-like) water delivery passageway 106 is formed between the exterior surface 82 of the inner conduit 62 and the interior surface 110 of the middle conduit 94. The function of the water delivery passageway 106 will be discussed in greater detail below.

The first end 96 of the middle conduit 94 terminates directly ahead of (and does not come in contact with) the front plate 86 of the primary electrode 50 in order to form an open zone 111 between these components. The second end 100 of the middle conduit 94 extends outwardly from the medial portion 60 of the electrode 50 as shown in FIG. 3 and is secured by welding or other conventional processes to the rear plate 92. It should also be noted that, prior to attachment of the second end 100 of the middle conduit 94 to the rear plate 92, the second end 100 passes through an opening 112 in an annular (e.g. ring-like) intermediate plate 113. After attachment of the second end 100 to the rear plate 92 as described above, the middle conduit 94 is likewise secured (e.g. by conventional welding processes and the like) within the opening 112 of the intermediate plate 113 in a fluid-tight manner. Attachment of the middle conduit 94 to the intermediate plate 113 occurs at a position spaced inwardly from the second end 100 of the conduit 94 as particularly shown in FIG. 3.

Finally, the primary electrode 50 includes a tubular outer conduit 114 having an open first end 116 and an open second end 120. In a preferred embodiment as shown in FIG. 3, the outer conduit 114 has a length which is slightly shorter (by about 10% or more) than the middle conduit 94. Likewise, the length of the outer conduit 114 is also shorter (by about 20% or more) than the inner conduit 62. The outer conduit 114 further includes a continuous (e.g. uninterrupted) annular side wall 122 which surrounds and defines an interior region 124 within the conduit 114 (FIG. 3). The middle conduit 94 is nested and centered inside the interior region 124 of the outer conduit 114. In this regard, the middle conduit 94 has a diameter which is considerably less (e.g. by about 30% or more) than the diameter of the outer conduit 114. As a result, an annular (e.g. ring-like) water flow passageway 126 is formed between the exterior surface 130 of the middle conduit 94 and the interior surface 132 of the outer conduit 114. The water flow passageway 126 is in fluid communication with the water delivery passageway 106 at the first end 54 of the electrode 50 via open zone 111 adjacent the front plate 86 as illustrated. The function of the water flow passageway 126 will be described in greater detail below.

Finally, the first end 116 of the outer conduit 114 is fixedly secured in a fluid-tight manner by welding or other conventional attachment methods to the front plate 86 of the primary electrode 50. The second end 120 of the outer conduit 114 is fixedly secured in a fluid-tight manner to the intermediate plate 113 of the electrode 50 by welding or other known methods for joining metal parts together.

The first end 54 of the primary electrode 50 includes a replaceable thread-on electrode tip 136 schematically illustrated in FIG. 3. The thread-on design of the tip 136 enables periodic removal and replacement of the tip 136 as needed. In many situations depending on the nature of the hydrocarbon composition 12 being cracked, external and internal deterioration of the tip 136 may occur because of heat flux loading to the metal surface of the tip 136 by the electrical arc between the electrodes 50, 52 (discussed below). Removal and replacement of the tip 136 can occur at pre-selected intervals or when deterioration becomes severe as determined by visual inspection. The tip 136 further includes a front portion 140 and a rear portion 142 illustrated in FIG. 3. In a preferred embodiment, the front portion 140 tapers inwardly to form a narrow-diameter terminal section 144. The rear portion 142 of the tip 136 includes a substantially flat end 146 which is designed for secure engagement against the front plate 86 of the electrode 50 (FIG. 3).

Passing entirely through the tip 136 from the front portion 140 to the rear portion 142 is an elongate and continuous gas exit passageway 150 having a central longitudinal axis $A_2$. The gas exit passageway 150 further includes an internally-threaded region 152 adjacent the rear portion 142 of the tip 136. The internally-threaded region 152 is designed for mating, threadable engagement with the externally threaded region 80 on the first end 64 of the inner conduit 62. In accordance with the outwardly-extending character of the first end 64 of the inner conduit 62 as illustrated in FIG. 3, the tip 136 is readily threaded onto the inner conduit 62. When the tip 136 is secured in position, the longitudinal axis $A_1$ of the gas flow passageway 74 through the inner conduit 62 will be in axial alignment with the longitudinal axis $A_2$ of the gas exit passageway 150 in the tip 136. As a result, gas materials travelling through gas flow passageway 74 in the inner conduit 62 can enter the gas exit passageway 150 through the tip 136 in a substantially uninterrupted manner in the direction of arrows 154 (FIG. 3).

With continued reference to FIG. 3, the side wall 122 of the outer conduit 114 includes a water inlet port 156 therethrough adjacent the second end 56 of the primary electrode 50. An upwardly-extending water delivery pipe 160 of tubular design is fixedly secured (by welding or other conventional attachment methods) to the side wall 122 directly over the water inlet port 156. As discussed below, the water delivery pipe 160 is designed to receive a supply of cooling water which enters the electrode 50 via the inlet port 156. Thereafter, the water travels through the water flow passageway 126 toward the first end 54 of the electrode 50 in the direction of arrows 160. The water then flows into the open zone 111 between the first end 96 of the middle conduit 94 and the front plate 86 in the direction of arrow 162. The cooling water thereafter travels through the water delivery passageway 106 back toward the second end 56 of the electrode 50 in the direction of arrow 164. In this manner, the various internal components of the primary electrode 50 are efficiently cooled.

Finally, as shown in FIG. 3, the side wall 102 of the middle conduit 94 further includes a water outlet port 170 therein. The water outlet port 170 is positioned between the intermediate plate 113 and the rear plate 92. To direct cooling water out of the primary electrode 50, a water drainage pipe 174 of tubular design is provided. The water drainage pipe 174 is fixedly secured (by welding or other conventional attachment methods) to the side wall 102 directly over the water outlet port 170. As a result, cooling water can travel from the water delivery passageway 106 into the pipe 174 in the direction of arrows 184, 185. The cooling water will thereafter leave the system 10 via the water drainage pipe 174. In addition, it should be noted that the use of a water cooling system within the primary electrode 50 shall be considered optional, with the present invention not being limited to any specific water cooling systems or the use of a water cooling system in general. Determinations regarding the use of a water cooling system shall be undertaken in accordance with preliminary pilot studies on the hydrocarbon materials 12 to be cracked using the present invention. However, as a general rule, a water cooling system of the type described above should be employed if the primary electrode 50 will be subjected to temperature levels in excess of about 250° F. during use.

In a preferred embodiment, the primary electrode 50 (and the internal components described above including the inner, middle, and outer conduits 62, 94, 114) will all be circular in cross-section. However, the size, shape, length, and general configuration of the primary electrode 50 will vary in view of the intended use and desired capacity of the plasma energy conversion system 10. In the exemplary embodiment involving a small scale version of the system 10 as described herein, the primary electrode 50 will have an overall length $L_1$ (FIG. 3) of about 15-20 cm, with a diameter $D_1$ (excluding the pipes 160, 174) of about 0.6–1.4 cm. Likewise, each of the conduits described above which are used to construct the primary electrode 50 (e.g. the inner, middle, and outer conduits 62, 94, 114) will have a uniform optimal side wall thickness of about 0.4–0.8 mm in the embodiment described herein. However, these numerical parameters are provided for example purposes with the present invention not being limited to any specific dimensions and thicknesses.

Regarding the construction materials used to produce the primary electrode 50, it is preferred that all of the components listed above (e.g. the inner conduit 62, the middle conduit 94, the outer conduit 114, the front plate 86, the rear plate 92, the intermediate plate 113, the water delivery pipe 160, and the water drainage pipe 174) be constructed of the same materials to avoid differential expansion of such components during high-temperature operation. The present invention shall not be limited to any particular construction materials for use in manufacturing the foregoing components. However, in a preferred embodiment, a conductive metal composition will be used which has a high level of strength, durability, and conductivity. Exemplary materials suitable for this purpose include but are not limited to elemental Cu, W, Ni, Zr, Co, and alloys thereof (e.g. Cu—Zr, Cu—W, Ni—Co, Ni—Cu—Co and other mixtures/alloys of the listed metals), as well as brass and stainless steel. In addition, a selected transition metal aluminide or transition metal titanide may also be used. Representative transition metal aluminides include NiAl, $Ni_3Al$, $Al_3Ni$, $Al_3Ni_2$, $Al_2Ni_3$, AlCo, $Al_5Co_2$, $Al_9Co_2$, $AlCo_3$, AlFe, $AlFe_3$, $Al_3Fe$ with exemplary transition metal titanides including NiTi, $NiTi_2$, $Ni_3Ti$, CoTi, $CoTi_2$, $CoTi$, FeTi, $Fe_2Ti$. The use of transition metal compositions as outlined above offers particular advantages in the system 10. Specifically, the foregoing materials provide catalytic activities in the cracking process, and likewise assist in hydrogenating or hydrotreating unsaturated hydrocarbons to produce saturated alkanes. The removable tip 136 (which shall be considered part of the primary electrode 50) may also be made from any of the foregoing materials listed above. However, in a preferred embodiment, the tip 136 will be made from a selected transition metal aluminide or titanide, with the remainder of the primary electrode 50 being produced from any of the other materials listed above.

In a preferred embodiment, the secondary electrode 52 will be substantially identical to the primary electrode 50 regarding the structural components which are employed, as well as the size, shape, length, diameter, and construction materials used to produce the electrode 52. Thus, all of the information provided above regarding the primary electrode 50 shall be applicable to the secondary electrode 52. However, for the sake of clarity and complete disclosure, the operating components of the secondary electrode 52 will now be described in detail.

Figure 4:
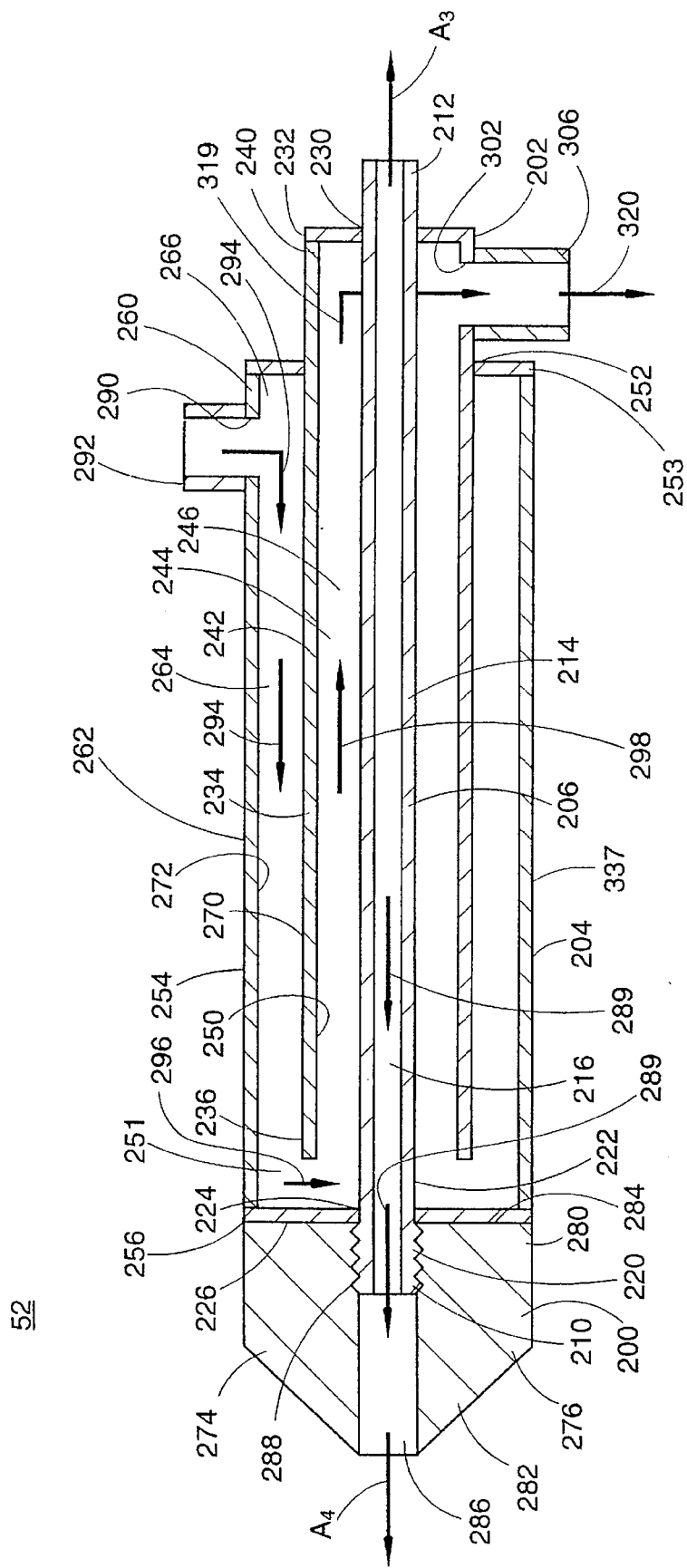
FIG. 4 is an enlarged schematic cross-sectional view of a representative secondary electrode which is suitable for use in the system of FIG. 1.

With reference to FIG. 4, The secondary electrode 52 specifically includes a first end 200, a second end 202, and a medial portion 204 between the first and seconds ends 200, 202. In a preferred embodiment, the medial portion 204 will be comprised of a nested, concentric arrangement of elongate tubular members. The tubular members (discussed below) form at least one and preferably multiple passageways through the electrode 52. As schematically represented in FIG. 4, the medial portion 204 of the electrode 52 includes a tubular inner conduit 206 having an open first end 210 and an open second end 212. The inner conduit 206 further includes a continuous (e.g. uninterrupted) annular side wall 214 which surrounds and defines a central gas flow passageway 216 through the inner conduit 206. The function of the gas flow passageway 216 will be discussed in greater detail below. As shown in FIG. 4, the gas flow passageway 216 has a central longitudinal axis $A_3$.

The first end 210 of the inner conduit 206 further includes an externally threaded region 220 on the exterior surface 222 of the side wall 214. The first end 210 of the inner conduit 206 likewise passes through an opening 224 in a front plate 226 associated with the electrode 52. As a result, the first end 210 extends outwardly from the medial portion 204 of the electrode 52 as shown in FIG. 4. Fluid-tight engagement between the front plate 226 and the first end 210 of the inner conduit 206 is desired and may be accomplished in many ways. For example, conventional welding techniques may be employed to secure the first end 210 to and within the opening 224 through the front plate 226. The second end 212 of the inner conduit 206 passes through an opening 230 in a rear plate 232 (FIG. 4), with the second end 212 extending outwardly therefrom. Fluid-tight engagement of the second end 212 of the inner conduit 206 within the opening 230 in the rear plate 232 is desired and may again be accomplished in many ways, including the use of conventional welding techniques (or other known attachment processes).

With continued reference to FIG. 4, the secondary electrode 52 further includes a middle conduit 234 of tubular design which is slightly shorter (e.g. by about 10% or more) than the inner conduit 206. In addition, the middle conduit 234 has an open first end 236, an open second end 240, and a continuous (e.g. uninterrupted) annular side wall 242 which surrounds and defines an interior region 244 within the conduit 234 (FIG. 4). The inner conduit 206 is nested and centered within the interior region 244 of the middle conduit 234, with the inner conduit 206 having a diameter which is considerably less (e.g. by about 30% or more) than the diameter of the middle conduit 234. As a result, an annular (e.g. ring-like) water delivery passageway 246 is formed between the exterior surface 222 of the inner conduit 206 and the interior surface 250 of the middle conduit 234. The function of the water delivery passageway 246 will be described in further detail below.

The first end 236 of the middle conduit 234 terminates directly ahead of (and does not come in contact with) the front plate 226 of the secondary electrode 52 in order to form an open zone 251 between these components. The second end 240 of the middle conduit 234 extends outwardly from the medial portion 204 of the electrode 52, and is fixedly secured (e.g. by conventional welding and the like) to the rear plate 232 of the electrode 52 in a fluid-tight manner (FIG. 4). It should also be noted that, prior to attachment of the second end 240 of the middle conduit 234 to the rear plate 232, the second end 240 passes through an opening 252 in an annular (e.g. ring-like) intermediate plate 253. After attachment of the second end 240 to the rear plate 232 as described above, the middle conduit 234 is likewise secured (e.g. by conventional welding processes and the like) within the opening 252 of the intermediate plate 253 in a fluid-tight manner. Attachment of the middle conduit 234 to the intermediate plate 253 occurs at a position spaced inwardly from the second end 240 of the conduit 234 as particularly shown in FIG. 4.

Finally, the secondary electrode 52 includes a tubular outer conduit 254 having an open first end 256 and an open second end 260. In a preferred embodiment illustrated in FIG. 4, the outer conduit 254 has a length which is slightly shorter (by about 10% or more) than the middle conduit 234. Likewise, the outer conduit 254 is shorter to an even greater extent (by about 20% or more) than the inner conduit 206. The outer conduit 254 further includes a continuous (e.g. uninterrupted) annular side wall 262 which surrounds and defines an interior region 264 within the conduit 254 (FIG. 4). The middle conduit 234 is nested and centered within the interior region 264 of the outer conduit 254, with the middle conduit 234 having a diameter that is considerably less (e.g. by about 30% or more) than the diameter of the outer conduit 254. As a result, an annular (e.g. ring-like) water flow passageway 266 is formed between the exterior surface 270 of the middle conduit 234 and the interior surface 272 of the outer conduit 254. The water flow passageway 266 is in fluid communication with the water delivery passageway 246 at the first end 200 of the electrode 52 via open zone 251 adjacent the front plate 226 as illustrated. The function of the water flow passageway 266 will be discussed in further detail below.

Finally, the first end 256 of the outer conduit 254 is fixedly secured in a fluid-tight manner by welding or other conventional attachment methods to the front plate 226 of the secondary electrode 52. The second end 260 of the conduit 254 is fixedly secured in a fluid-tight manner to the intermediate plate 253 by welding and the like.

The first end 200 of the secondary electrode 52 includes a replaceable thread-on electrode tip 274 schematically illustrated in FIG. 4. The thread-on design of the tip 274 enables periodic removal and replacement of the tip 274 as needed. As indicated above in connection with the tip 136 associated with the primary electrode 50, external and internal deterioration of the tip 274 associated with the secondary electrode 52 may occur. The causes of tip deterioration are discussed above. Removal and replacement of the tip 274 can occur at pre-selected intervals or when deterioration becomes severe as determined by visual inspection. The tip 274 further includes a front portion 276 and a rear portion 280 illustrated in FIG. 4. In a preferred embodiment, the front portion 276 gradually tapers inwardly to form a narrow-diameter terminal section 282. The rear portion 280 includes a substantially flat end 284 which is designed for secure engagement directly against the front plate 226 of the electrode 52 (FIG. 4).

Passing entirely through the tip 274 from the front portion 276 to the rear portion 280 is an elongate and continuous gas exit passageway 286 having a central longitudinal axis $A_4$. The gas exit passageway 286 further includes an internally threaded region 288 adjacent the rear portion 280 of the tip 274. The internally threaded region 288 is designed for mating, threadable engagement with the externally threaded region 220 on the first end 210 of the inner conduit 206. In accordance with the outwardly-extending character of the first end 210 of the inner conduit 206 as illustrated in FIG. 4, the tip 274 may be readily threaded onto the inner conduit 206. When the tip 274 is secured in position, the longitudinal axis $A_3$ of the gas flow passageway 216 through the inner conduit 206 is in axial alignment with the longitudinal axis $A_4$ of the gas exit passageway 286 in the tip 274. As a result, gas materials travelling through the gas flow passageway 216 in the inner conduit 206 can enter the gas exit passageway 286 through the tip 274 in a substantially uninterrupted manner in the direction of arrows 289 (FIG. 4).

With continued reference to FIG. 4, the side wall 262 of the outer conduit 254 includes a water inlet port 290 therein adjacent the second end 202 of the secondary electrode 52. An upwardly-extending water delivery pipe 292 of tubular design is fixedly secured (by welding or other conventional attachment methods) to the side wall 262 directly over the water inlet port 290. As discussed further below, the water delivery pipe 292 is designed to receive a supply of cooling water which enters the electrode 52 via the inlet port 290. Thereafter, the water travels through the water flow passageway 266 toward the first end 200 of the electrode 52 in the direction of arrows 294. The water then flows into the open zone 251 between the first end 236 of the middle conduit 234 and the front plate 226 of the electrode 52 in the direction of arrow 296. Next, cooling water flows through the water delivery passageway 246 back toward the second end 202 of the electrode 52 in the direction of arrow 298. In this manner, the various internal components of the secondary electrode 52 are efficiently cooled.

Finally, as shown in FIG. 4, the side wall 242 of the middle conduit 234 further includes a water outlet port 302 therein. The water outlet port 302 is positioned between the intermediate plate 253 and the rear plate 232. To direct cooling water out of the secondary electrode 52, a water drainage pipe 306 of tubular design is provided. The water drainage pipe 306 is fixedly secured (by welding or other conventional attachment methods) to the side wall 242 directly over the water outlet port 302. As a result, cooling water can travel from the water delivery passageway 246 into the pipe 306 in the direction of arrows 319, 320. The cooling water will thereafter leave the system 10 via the water drainage pipe 306. As stated above in connection with the primary electrode 50, the use of a water cooling system within the secondary electrode 52 shall be considered optional, with the present invention not being limited to any specific water cooling systems or the use of a water cooling system in general. Determinations regarding the use of a water cooling system shall be undertaken in accordance with preliminary pilot studies on the hydrocarbon materials to be cracked using the present invention. However, as a general rule, a water cooling system of the type described above should be employed if the secondary electrode 52 will be subjected to temperature levels in excess of about 250° F. during use.

As a final point regarding construction of the primary and secondary electrodes 50, 52, they may both be produced from the same materials (preferably selected from the list provided above), or the primary electrode 50 may be manufactured from one composition, with the secondary electrode 52 being constructed from a different material.

With reference to FIG. 1, the primary and secondary electrodes 50, 52 are securely mounted to the containment vessel 20 so that at least a portion of each electrode 50, 52 is positioned directly within the liquid hydrocarbon composition 12 inside the vessel 20. Specifically, as shown in FIG. 1, the first end 54 of the primary electrode 50 and the first end 200 of the secondary electrode 52 are positioned (e.g. submerged) entirely within the hydrocarbon composition 12 inside the containment vessel 20. This arrangement of components may be accomplished in many different ways, with the present invention not being limited to any particular method for attaching/mounting the primary and secondary electrodes 50, 52 to the containment vessel 20. However, a preferred attachment method is shown schematically in FIG. 1.

With reference to FIG. 1, the first opening 24 in the first side wall 22 of the containment vessel 20 is lined with an annular primary insulating member 330 having a bore 332 therethrough. In a preferred embodiment, the insulating member 330 is sized for precise frictional engagement within the opening 24 as illustrated. The bore 332 is sized to receive and frictionally engage the medial portion 60 of the primary electrode 50 therein. The insulating member 330 is constructed from a non-conductive composition which prevents the direct flow of electricity from the electrode 50 to the containment vessel 20 during operation of the system 10. Regarding the particular materials which may be used to produce the insulating member 330, the present invention shall not be limited to any particular compositions for this purpose. However, exemplary construction materials suitable for producing the insulating member 330 will include but not be limited to boron nitride or polytetrafluoroethylene (e.g. Teflon®). With continued reference to FIG. 1, the medial portion 60 of the primary electrode 50 is positioned within the bore 332 in the insulating member 330. In particular, the bore 332 is sized to precisely and frictionally engage the exterior surface 333 of the outer conduit 114 associated with the primary electrode 50. As a result, the primary electrode 50 is securely mounted to the containment vessel 20 so that the first end 54 is positioned within the hydrocarbon composition 12 inside the vessel 20, with the second end 56 being located outside the vessel 20. It is important to note that use of the insulating member 330 is of primary consequence when the vessel 20 is made of a conductive metal composition. If the vessel 20 is non-conductive (e.g. made from fused quartz, borosilicate glass, alumina, or polytetrafluoroethylene [e.g. Teflon®]), the insulating member 330 can be eliminated if desired. The primary electrode 50 would then be frictionally engaged or secured with conventional mechanical fasteners to and within the first opening 24 in the first side wall 22 of containment vessel 20.

The secondary electrode 52 is attached to the containment vessel in substantially the same manner described above regarding the primary electrode 50. As illustrated in FIG. 1, the second opening 30 in the second side wall 26 of the containment vessel 20 is lined with an annular secondary insulating member 334 having a bore 336 therethrough. The secondary insulating member 334 preferably has the same shape and dimensions as the primary insulating member 330. In particular, the insulating member 334 is configured for precise frictional engagement within the second opening 30 in the second side wall 26 as shown. Likewise, the bore 336 is sized to receive and frictionally engage in a secure manner the secondary electrode 52 therein. The insulating member 334 is constructed from a non-conductive composition which prevents the direct flow of electricity from the electrode 52 to the containment vessel 20 during operation of the system 10. The same materials listed above in connection with the primary insulating member 330 may be used to manufacture the secondary insulating member 334. In this regard, exemplary construction materials suitable for producing the secondary insulating member 334 will include but not be limited to boron nitride or polytetrafluoroethylene (e.g. Teflon®).

With continued reference to FIG. 1, the medial portion 204 of the secondary electrode 52 is positioned within the bore 336 in the insulating member 334. In particular, the bore 336 is sized to precisely and frictionally engage the exterior surface 337 of the outer conduit 254 associated with the secondary electrode 52. As a result, the secondary electrode 52 is securely mounted to the containment vessel so that the first end 200 is positioned within the hydrocarbon composition 12 inside the vessel 20, with the second end 202 being located outside the vessel 20. It should again be noted that use of the insulating member 334 is of primary importance when the vessel 20 is made of a conductive metal composition. If the vessel 20 is non-conductive as stated above, the insulating member 334 can be eliminated. The secondary electrode 52 would then be frictionally engaged or secured with conventional mechanical fasteners to and within the second opening 30 in the second side wall 26 of containment vessel 20.

As previously indicated, the first opening 24 in the first side wall 22 of the containment vessel 20 is in axial alignment with the second opening 30 in the second side wall 26 of the vessel 20. As a result, the primary and secondary electrodes 50, 52 are likewise in axial alignment with each other (FIG. 1) when they are mounted to the vessel 20. Furthermore, the first end 200 (e.g. the tip 274) of the secondary electrode 52 is positioned directly adjacent to and spaced apart from the first end 54 (e.g. the tip 136) of the primary electrode 50 to form a gap 340 between the primary and secondary electrodes 50, 52. As discussed below, the electrical arc and plasma gas bubble will be formed within the gap 340. The length of the gap 340 will vary based on numerous factors including the size of the system 10 and the hydrocarbon composition 12 being treated as determined by preliminary laboratory testing. However, it is preferred that the gap 340 be as small as possible to ensure that excessive temperatures are not generated within the vessel 20. In an optimal small-scale embodiment suitable for processing the hydrocarbon compositions 12 described above, the gap 340 will have a preferred length $G_1$ (FIG. 1) of about 1–3 mm (optimum=about 2 mm).

To generate a submerged electrical arc between the gap 340 within the liquid hydrocarbon composition 12, a power supply is operatively connected to both of the electrodes 50, 52 so that an electrical potential can be applied to the electrodes 50, 52. Either an AC (alternating current) or a DC (direct current) potential may be applied to electrodes 50, 52 in order to generate the arc. The present invention shall not be limited to any particular parameters in connection with the type and magnitude of the electrical potential. The specific characteristics of the electrical potential shall be determined in accordance with preliminary pilot studies on the type of hydrocarbon composition 12 to be cracked. However, in a preferred embodiment which is suitable for use with the hydrocarbon compositions 12 listed above (e.g. crude oil, refinery residuum, and high molecular weight precursor hydrocarbon materials of synthetic or natural origin), an AC electrical potential will be used, with a voltage value of about 0.5–15.0 kV AC (optimum: about 0.9–1.5 kV AC), a current value of about 100–500 mA AC (optimum=about 400–500 mA AC), and a frequency of about 0.4 kHz or greater (although a conventional 60 Hz rating will work). The above-listed numerical values are preferred because they enable the generation of a stable arc submerged within the hydrocarbon composition 12 which is characterized by effective power delivery to the composition 12.

To apply a suitable electrical potential to the primary and secondary electrodes 50, 52, a power supply 350 is electrically attached to each of the electrodes 50, 52 as schematically shown in FIG. 1. The present invention shall not be limited to any particular apparatus in connection with the power supply 350, with many different commercially-available power generation systems being acceptable for use as the supply 350. In particular, any AC or DC power supply system may be employed with a minimum 5 kV and 5 amp rating. An exemplary power supply system which is suitable for producing the AC electrical potential values listed above is commercially available from LumenX, Inc. of New Durham, N.H. (U.S.A.)—(model no. LX-3480-2). This system has dual AC/DC capabilities with a 15 kV/0.5 A rating, and is also capable of generating a high frequency output (e.g. 0.4 kHz or greater). Alternating current frequency values which are higher than 60 Hz are advantageous in that they generally lower the voltage levels that are necessary to produce and sustain a submerged arc within the hydrocarbon composition 12. In an alternative embodiment, a DC electrical potential may be supplied to the primary and secondary electrodes 50, 52. A preferred and optimum DC electrical potential will likewise have a voltage value of about 0.5–15.0 kV DC (optimum=about 0.9–1.5 kV DC) and a current value of about 100–500 mA DC (optimum=about 400–500 mA DC). These ranges are preferred because they will likewise enable the generation of a stable arc submerged within the hydrocarbon composition 12 which is characterized by effective power delivery to the composition 12. Many different DC power supply systems may be used to produce the DC electrical potential listed above. An exemplary, commercially-available high-voltage DC system suitable for use as the power supply 350 will involve the dual AC/DC system described above which is available from LumenX, Inc. of New Durham, N.H. (U.S.A.) (model no. LX-3480-2). Finally, it should be noted that either a single DC power delivery system may be used as the power supply 350 or a plurality of connected individual DC power units may be employed, if desired. If multiple DC power units are used, they can be connected together in series to achieve higher voltage levels or in parallel for greater current values.

As illustrated in FIG. 1, the "+" terminal 352 of the power supply 350 is electrically connected by conductive lead (wire) 354 to the second end 56 of the primary electrode 50 at position 356 thereon by conventional means (e.g. by welding or the use of a standard clamp apparatus or other conventional electrical connecting unit). The "−" terminal 360 of the power supply 350 is electrically connected by conductive lead (wire) 362 to the second end 202 of the secondary electrode 52 at position 364 thereon by conventional means of the same type discussed above relative to the primary electrode 50. It should be noted that the polarity orientation described above and illustrated in FIG. 1 may be reversed without loss of system effectiveness.

As previously stated, one or both of the primary and secondary electrodes 50, 52 may include an optional water cooling system associated therewith. Such a system is schematically shown in FIG. 1. With reference to FIG. 1, a supply of water 370 is provided which is stored within a containment tank 372. In a preferred embodiment, the water 370 will have a temperature of about 60°–100° F. (optimum=about 80° F.). Cooling of the water 370 (if necessary) may be achieved using a number of conventional cooling systems, including a standard refrigeration-type chiller unit 374 which is part of or operatively connected to the containment tank 372. In the embodiment of FIG. 1, a tubular fluid transfer conduit 376 is provided having a first end 380, a second end 382, and an in-line pump 384 between the first and second ends 380, 382. The in-line pump 384 may be of any conventional type, including but not limited to a standard centrifugal pump known in the art. The first end 380 of the fluid transfer conduit 376 is operatively connected to the tank 372. The second end 382 is attached to the water delivery pipe 160 at the second end 56 of the primary electrode 50. Using these components (including the pump 384), the water 370 may be delivered into the primary electrode 50 for cooling purposes, with the flow path of the water 370 being described above and illustrated in FIG. 3. After passing through the primary electrode 50, the water 370 will leave electrode 50 via water drainage pipe 174 (FIG. 1). The water 370 may then be discarded, used for other purposes, or preferably transferred back to the tank 372 via return conduit 386 for reuse in the system 10. The flow rate of the water 370 through the primary electrode 50 will depend on the amount of cooling which is necessary as determined by preliminary tests. However, in a preferred embodiment involving the small-scale pilot system 10 described herein, optimum results will be achieved if the pump 384 is used to deliver water 370 into and through the primary electrode 50 at a preferred flow rate of about 0.03–0.08 gpm (gallons per minute).

A comparable cooling system may be used in connection with the secondary electrode 52. With continued reference to FIG. 1, a tubular fluid transfer conduit 388 is provided having a first end 390, a second end 392, and an in-line pump 394 between the first and second ends 390, 392. The in-line pump 394 may be of any conventional type, including but not limited to the same type described above regarding the pump 384 (e.g. a standard centrifugal pump known in the art). The first end 390 of the fluid transfer conduit 388 is operatively connected to the tank 372 having water 370 therein which is maintained at the temperature level listed above. The second end 392 of the fluid transfer conduit 388 is connected to the water delivery pipe 292 at the second end 202 of the secondary electrode 52. Using these components (including the pump 394), the water 370 may be delivered into the secondary electrode 52 for cooling purposes, with the flow path of the water 370 being described above and illustrated in FIG. 4. After passing through the secondary electrode 52, the water 370 will leave electrode 52 via water drainage pipe 306 (FIG. 1). As stated above, the water 370 may then be discarded, used for other purposes, or preferably transferred back to the tank 372 via return conduit 396 for reuse in the system 10. The flow rate of the water 370 through the secondary electrode 52 in the embodiment described herein will preferably be equivalent to the flow rate set forth above in connection with the primary electrode 50 (e.g. about 0.03–0.08 gpm in the present embodiment). As a final point, while the embodiment of FIG. 1 uses a single supply of water 370 for both electrodes 50, 52, it shall be deemed equivalent to provide a separate water supply and associated delivery hardware (not shown) for each electrode 50, 52.

Next, at least one reactive gas composition is supplied/delivered to the primary and secondary electrodes 50, 52. As discussed in greater detail below, the reactive gas is designed to cooperate with the electrical arc in the system 10 to produce a "plasma bubble" which cracks the hydrocarbon composition 12 in a highly efficient manner. In particular, the reactive gas functions in cooperation with the electrical arc to produce reactive species in the system 10 (e.g. ethyl radicals, methyl radicals, hydrogen atoms, and the like). Also, the gas and arc cooperate to generate ultraviolet radiation and heat as discussed below. With reference to FIG. 1, a supply of reactive gas 400 is provided which is retained within a storage tank 402. Within the tank 402, the gas is preferably maintained at ambient temperature levels (e.g. about 65°–70° F.) and is pressurized to a level of about 40–80 psig. The present invention shall not be limited to any particular compositions in connection with the gas 400. However, exemplary and preferred materials suitable for use as the gas 400 include but are not limited to $CH_4$, $N_2$, $H_2$, CO, $CO_2$, $NH_3$, air, steam, $Br_2$, $Cl_2$, $F_2$, and mixtures thereof. In addition, hydrogen halides (e.g. gaseous HCl or HBr) may also be used as the gas 400. Due to the inert nature of the noble gases (e.g. He, Xe, Ar, Kr, Xe, and Rn), such materials should be avoided in connection with the gas 400.

In the embodiment of FIG. 1, a tubular gas transfer conduit 404 is provided having a first end 406, a second end 408, and a gas pressure regulator 410 of standard design between the first and second ends 406, 408. The first end 406 of the gas transfer conduit 404 is operatively connected to the tank 402. The second end 408 of the gas transfer conduit 404 is attached to the second end 70 of the inner conduit 62 associated with the primary electrode 50 as shown in FIG. 1. Using these components, the gas 400 may be delivered to primary electrode 50 and through the gas flow passageway 74 for ultimate delivery to the tip 136 of the electrode 50. The gas 400 will thereafter enter the gap 340 between the electrodes 50, 52 in order to form the plasma bubble as discussed below. Regarding the flow rate of the gas 400 into the primary electrode 50, the selected rate will depend on a variety of factors including the desired capacity of the system 10 and the particular gas 400 being used. However, regarding treatment of the hydrocarbon compositions 12 listed above, an optimum and exemplary gas flow rate will be about 0.05–1.0 liter/min. which is controlled using the pressure regulator 410.

Regarding delivery of the pressurized gas 400 to the secondary electrode 52, a tubular gas transfer conduit 412 is provided having a first end 414, a second end 416, and a gas pressure regulator 420 of conventional design between the first and second ends 414, 416. The first end 414 of the gas transfer conduit 412 is operatively connected to the tank 402 (which contains the gas 400 as described above). The second end 416 of the gas transfer conduit 412 is attached to the second end 212 of the inner conduit 206 associated with the secondary electrode 52 as shown in FIG. 4. Using these components, the gas 400 may be delivered into the secondary electrode 52 and through the gas flow passageway 216 for ultimate delivery to the tip 274 of the electrode 52. The gas 400 will then enter the gap 340 between the electrodes 50, 52 and thereafter combine with the flow of gas 400 from the primary electrode 50. As a result, the plasma bubble surrounding the arc will be produced. Regarding the flow rate of the gas 400 into the secondary electrode 52, the selected rate will preferably be the same as the rate described above in connection with the primary electrode 50 (e.g. about 0.05–1.0 liter/min.) This flow rate can be achieved and controlled using the pressure regulator 420.

As a final point, while the embodiment of FIG. 1 uses a single supply of gas 400 for both electrodes 50, 52, it shall be deemed equivalent to provide a separate gas supply and associated delivery hardware (not shown) for each electrode 50, 52.

Figure 2:
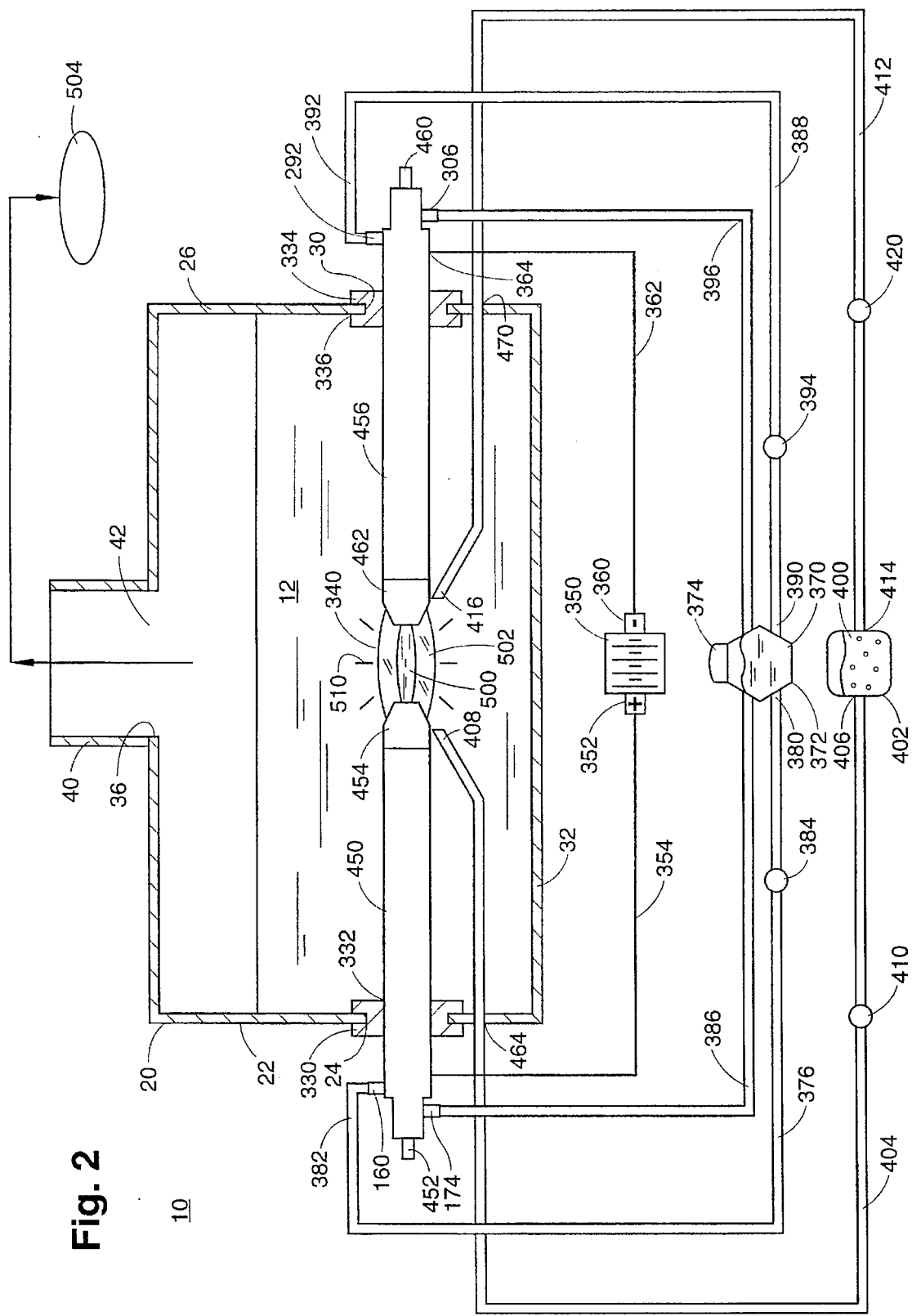
FIG. 2 is a schematic representation (partially in cross-section) of an alternative embodiment of the plasma energy conversion system illustrated in FIG. 1.
Figure 5:
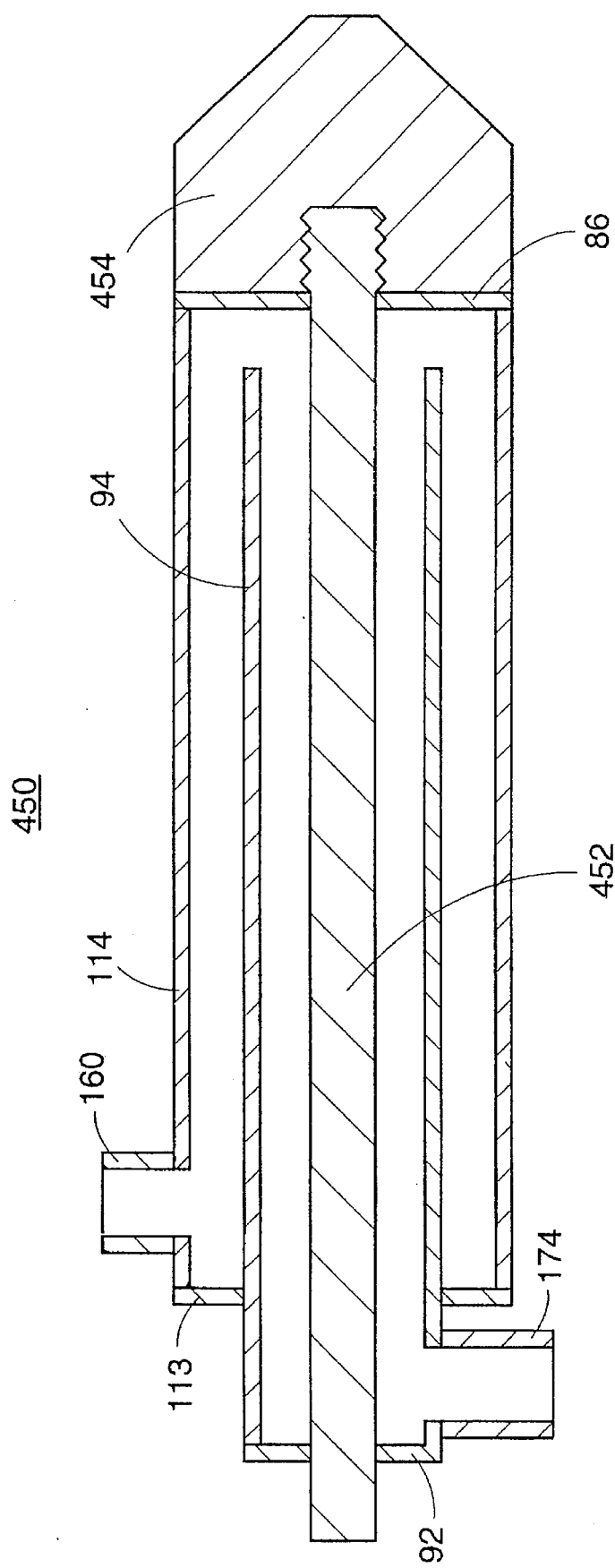
FIG. 5 is an enlarged schematic cross-sectional view of a modified primary electrode which is appropriate for use in the alternative system of FIG. 2.

While the preferred methods and components used for delivering the gas 400 to the system 10 are illustrated in FIG. 1 and listed above, an alternative gas delivery method is shown in FIG. 2. All of the components, parameters, materials, and procedures described above regarding the embodiment of FIG. 1 are applicable to the embodiment of FIG. 2 with two exceptions. First, the gas flow passageway 74 through the inner conduit 62 of the original primary electrode 50 is omitted in the present alternative embodiment. Specifically, as shown in FIG. 5, a modified primary electrode 450 is provided in which the inner conduit 62 is replaced with a solid elongate inner member 452. Likewise, the tip 136 in the original primary electrode 50 which included the gas exit passageway 150 is replaced with a modified solid tip 454 (FIG. 5) which does not include the gas exit passageway 150 therein.

Figure 6:
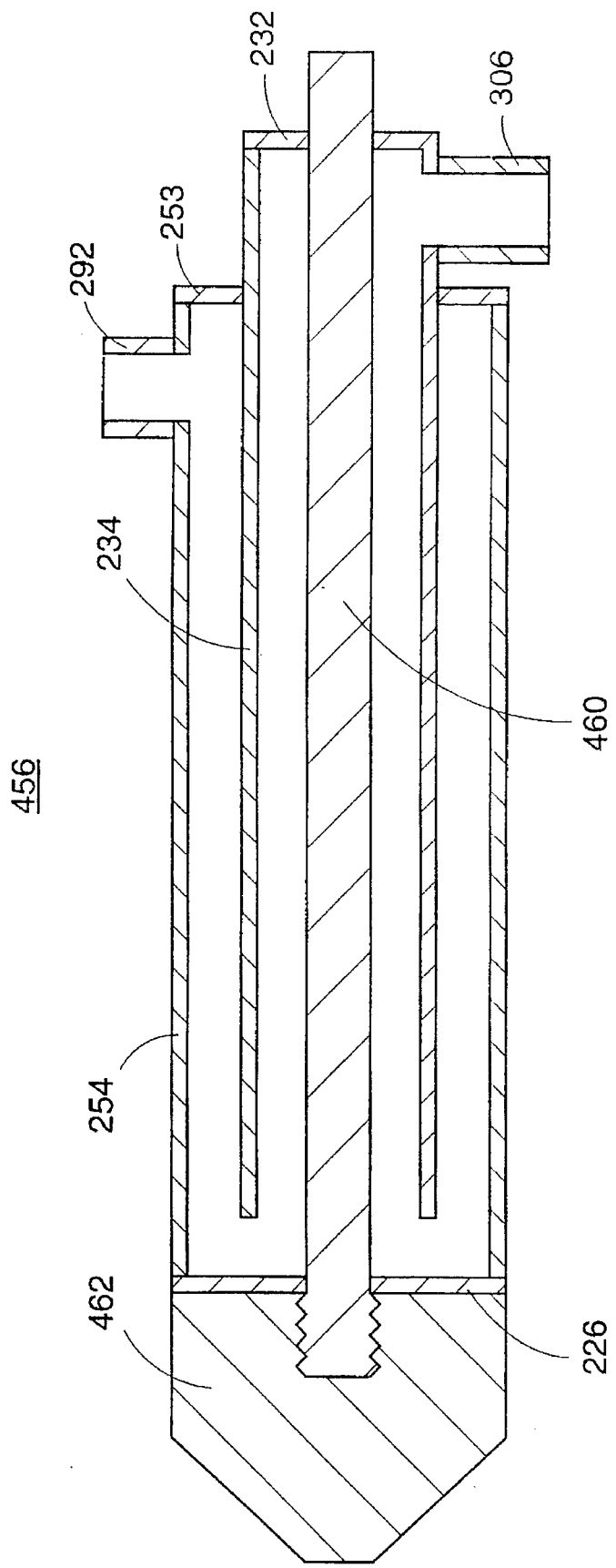
FIG. 6 is an enlarged schematic cross-sectional view of a modified secondary electrode which is appropriate for use in the alternative system of FIG. 2.

In a similar manner as shown in FIG. 6, the original secondary electrode 52 is replaced with a modified secondary electrode 456 in which the inner conduit 206 associated with the original secondary electrode 52 is replaced with a solid elongate inner member 460. Likewise, the tip 274 in the original secondary electrode 52 which included the gas exit passageway 286 is replaced with a modified solid tip 462 (FIG. 6) which does not include the gas exit passageway 286 therein. All of the other components of the modified primary and secondary electrodes 450, 456 are the same as those in the original primary and secondary electrodes 50, 52 as illustrated in FIGS. 1 and 3–4. Structural components which are common to both the primary electrode 50 and the modified primary electrode 450 are designated by the same reference numbers in FIGS. 3 and 5. Likewise, components which are common to both the secondary electrode 52 and the modified secondary electrode 456 are designated by the same reference numbers in FIGS. 4 and 6.

Regarding gas delivery in the embodiment of FIG. 2, the first end 406 of the gas transfer conduit 404 is operatively connected to the gas storage tank 402 as described above. The second end 408 passes through an opening 464 in the first side wall 22 of the containment vessel 20 and is thereafter positioned directly adjacent the tip 454 associated with the modified primary electrode 450 (e.g. adjacent the gap 340 as shown in FIG. 2). In the embodiment of FIG. 2, the conduit 404 is preferably made of a non-conductive material (e.g. polytetrafluoroethylene [Teflon®] or other inert plastic), and will be frictionally engaged or otherwise sealed in a conventional manner within the opening 464 in the wall 22 of the containment vessel 20. Gas 400 may then be delivered to the electrode 450/gap 340 in the same manner described above regarding the delivery of gas 400 to the primary electrode 50 in the embodiment of FIG. 1.

A similar arrangement of components is used to deliver the gas 400 to the modified secondary electrode 456. Specifically, the first end 414 of the gas transfer conduit 412 is operatively connected to the gas storage tank 402 as described above. The second end 416 passes through an opening 470 in the second side wall 26 of the containment vessel 20 and is thereafter positioned directly adjacent the tip 462 associated with the modified secondary electrode 456 (e.g. adjacent the gap 340 as illustrated in FIG. 2). In the embodiment of FIG. 2, the conduit 412 will likewise be made of the same non-conductive materials listed above in connection with the conduit 404, and will be secured within the opening 470 through the containment vessel 20 in a conventional manner as previously described regarding conduit 404. Gas 400 may then be delivered to the electrode 456/gap 340 for generation of the plasma bubble as discussed below.

As a final note concerning the embodiment of FIG. 2, the modified electrodes 450, 456 may be individually combined with the electrodes 50, 52 used in the apparatus of FIG. 1 to create a "hybrid" system. For example, an exemplary hybrid system would involve a combination of the original primary electrode 50 with the modified secondary electrode 456, or a combination of the modified primary electrode 450 with the original secondary electrode 52. Operation of these hybrid systems would be accomplished using a combination of the gas delivery methods described above in connection with the embodiments of FIGS. 1 and 2. Accordingly, the present invention shall not be limited to any particular type or arrangement of electrodes. While the following "System Operation" section shall primarily involve the embodiment of FIG. 1, it is equally applicable to the other embodiments and variations discussed above.

SYSTEM OPERATION

To produce a cracked hydrocarbon product from the selected hydrocarbon composition 12, an electrical potential is applied to the primary electrode 50 and the secondary electrode 52. At substantially the same time, the gas 400 and cooling water 370 (if used) are delivered to the electrodes 50, 52. These processes are described in detail above. As a result, an electrical arc 500 is formed within the gap 340 as schematically illustrated in FIG. 1. The arc 500 is entirely submerged within the hydrocarbon composition 12 inside the vessel 20. As the electrical potential is applied to the electrodes 50, 52, the hydrocarbon composition 12 (which functions as a dielectric medium) vaporizes and ionizes to provide a conductive pathway between the electrodes 50, 52 so that sustained generation of the arc 500 can occur. The arc 500 will have arc voltage and current values which are substantially equivalent to the voltage/current values listed above in connection with the electrical potential applied to the electrodes 50, 52. This relationship exists because of the conductive nature of the electrodes 50, 52 which allows uninterrupted transmission of the electrical potential to the first ends 54, 200 of the electrodes 50, 52 with minimal resistive losses. As a result, the voltage and current values associated with the arc 500 at the first ends 54, 200 of the electrodes 50, 52 will correspond with the voltage/current values of the electrical potential applied to the electrodes 50, 52. In accordance with the information provided above regarding the electrical potential delivered to the electrodes 50, 52, the arc 500 will have an arc voltage of about 0.5–15.0 kV AC (optimum: about 0.9–1.5 kV AC) and an arc current of about 100–500 mA AC (optimum: about 400–500 mA AC). If a DC power supply 350 is used, the arc 500 will likewise have an arc voltage of about 0.5–15.0 kV DC (optimum=about 0.9–1.5 kV DC) and an arc current of about 100–500 mA DC (optimum=about 400–500 mA DC). In addition, the arc 500 will have a length equal to the length $G_1$ of the gap 340 as stated above. This length will be about 1–3 mm (optimum=about 2 mm) for the small-scale reactor system described herein, with larger gaps being used for industrial-scale processing units.

As the arc 500 travels between the electrodes 50, 52 within the gap 340, the reactive gas 400 passes into the gap 340 from the tip 136 of the primary electrode 50 and the tip 274 of the secondary electrode 52. The gas 400 thereafter comes in direct contact with the arc 500. As a result, the gas 400 forms a plasma bubble 502 around (e.g. entirely surrounding) the arc 500. The term "plasma bubble" as used herein shall be defined to involve a highly viscous, superheated supply of partially ionized gaseous materials which facilitates the formation of a conductive pathway between the electrodes 50, 52. In a typical and preferred embodiment, the bubble 502 will have a volume of about 1–3 cc in the system 10 described herein (e.g. which involves an arc gap 340 having a length $G_1$ of about 1–3 mm.) Again, larger systems may have a bubble 502 of greater volume, depending on the particular system of interest.

The electrical arc 500 and plasma bubble 502 cooperate to produce a cracked hydrocarbon product 504 (FIG. 1) from the initial hydrocarbon composition 12 as discussed further below. Notwithstanding the presence of arc 500 within the hydrocarbon composition 12, combustion (e.g. burning) of the hydrocarbon composition 12 does not occur because no free oxygen is present to support combustion of the hydrocarbon composition 12. Conversion of the hydrocarbon composition 12 into the cracked hydrocarbon product 504 occurs in a rapid manner. The specific amount of time which is needed by the system 10 to crack the hydrocarbon composition 12 will vary, depending on the size and desired capacity of the system 10. Typical cracking times associated with small-scale systems of the type described herein will involve about 10–15 minutes per 50 ml of liquid hydrocarbon composition 12. However, as noted above, this value will vary depending on a wide variety of factors, including the type of composition 12 being treated, as well as the size of the components being used in the system 10 (e.g. the size of the electrodes 50, 52 and vessel 20). Typical reaction times for any given situation will be determined by preliminary experimental testing. The underlying physical mechanisms associated with the cracking process of the present invention are not entirely understood. However, it is contemplated that the reactive plasma which results from an interaction between the electrical arc 500 and the gas 400 produces a high concentration of highly-reactive hydrocarbon free radicals. These free radicals collide and react vigorously with unreacted hydrocarbon molecules in the composition 12 to produce a range of lighter hydrocarbon molecules. To avoid excessive distillation of the composition 12 and prevent losses of the cracked hydrocarbon product 504, an additional step in the reaction process involves maintaining the liquid hydrocarbon composition 12 at an average bulk temperature of about 70°–150° F. (e.g. optimum=about 100° F.) during operation of the system 10. The terms "average bulk temperature" and "average temperature" (which shall be deemed equivalent as previously discussed) involve the mean temperature of the hydrocarbon composition 12 at all points within the composition 12 including locations which are immediately adjacent the electrical arc 500 and locations remotely spaced from the arc 500. Even though high temperatures of about 10,000°–15,000° K. exist directly at the electrical arc 500 and plasma bubble 502, minimal effort is needed to ensure that the remainder of the hydrocarbon composition 12 is maintained at the above-described level. This situation exists because of the small size of the arc 500, the minimal volume of the plasma bubble 502 (listed above), and a rapid quench rate associated with the plasma in the system 10. As a result, heat generated by the arc 500 is quickly dissipated into the hydrocarbon composition 12 (especially if heavy crude oil is involved). However, to ensure that proper temperature levels are sustained within the hydrocarbon composition 12 in the vessel 20, the arc current is maintained at a low level as indicated above to minimize joule heating ($I^2R$) within the system 10. Sufficient results will be achieved in most cases if the arc current is maintained at the levels listed above. To further control the temperature within the hydrocarbon composition 12, the size (length) of the arc 500 should be maintained within the previously-described range. Likewise, the flow rate of the gas 400 into the electrodes 50, 52 (which will normally be about 0.05–1.0 liter/min. as stated above) can be increased as necessary and determined by precise monitoring of the hydrocarbon composition 12 to provide a cooling effect. However, temperature levels within the system 10 and the specific techniques which are used to control temperature in a given situation will vary in view of numerous factors ranging from the type of hydrocarbon composition 12 being treated to the size of the system 10. Precise temperature control is therefore achieved using preliminary experimental studies and tests involving the particular hydrocarbon materials of interest. Under normal circumstances, use of the reaction parameters described above (e.g. involving arc length, arc current, arc voltage, and gas flow rate) should provide adequate temperature control without further significant adjustment.

The plasma bubble 502 also produces a substantial amount of ultraviolet radiation 510 schematically illustrated in FIG. 1. The presence of ultraviolet radiation 510 within the hydrocarbon composition can result in the fragmentation of high molecular weight organic molecules into lower molecular weight molecules by photolysis. This effect is best observed in heavy crude oil which involves a thick black liquid that absorbs energy in a highly efficient manner. Ultraviolet radiation 510 is generated during the ionization processes caused by the electrical arc 500. Specifically, during operation of the system 10, molecules of the gas 400 are stripped of their outer valence electrons to form ions. The energy states of these charged particles are very high. When the charged particles ultimately recombine to form non-charged molecules, energy is given off as ultraviolet radiation in an amount proportional to the plasma volume.

In summary, the thermal energy generated from the arc 500/plasma bubble 502, the corresponding creation of hydrocarbon free radicals, and the production of ultraviolet radiation 510 collectively enable the hydrocarbon composition 12 to be cracked in a highly efficient manner. As a result, the cracked hydrocarbon product 504 will be produced which can be used for many purposes including the production of motor fuels if crude oil is used as a starting material.

The cracked hydrocarbon product 504 may consist of many different materials, depending on the nature of the composition 12 being processed. For example, if crude oil is involved, the cracked hydrocarbon product 504 will contain a significant amount of mixed $C_1$–$C_4$ alkanes and alkenes (e.g. methane, ethylene, ethane, propylene, 1-propyne, propane, and butane). When crude oil is used as a starting material, the specific compounds in the cracked hydrocarbon product 504 will vary in view of the type, grade, and geographical origin of the oil. If refinery residuum (defined above) is cracked in accordance with the invention, the cracked hydrocarbon product 504 will typically contain many different hydrocarbon materials including mixed $C_1$–$C_4$ alkanes and alkenes, cyclic and normal $C_5$–$C_8$ alkanes and alkenes, aromatic compounds, branched materials, and other organic compositions of varying size and structure. The cracking of materials other than crude oil and refinery residuum such as high molecular weight organic precursor compounds will produce a cracked hydrocarbon product 504 comprised of many different compounds in combination. The identity of these materials will depend on the particular organic composition being treated.

As indicated above, the cracked hydrocarbon product 504 will typically contain a variable mixture of reduced molecular weight organic compounds in both gas and liquid form. After removal from the system 10 through the third opening 36 and tubular conduit 40 in the containment vessel 20, desired compositions in the cracked hydrocarbon product 504 may be separated and isolated using many different conventional approaches which are known in the art for this purpose. For example, a standard cold trap may be used in connection with light condensible liquids, with a conventional activated carbon trap being employed to collect non-condensible light gases. Other known separation techniques (which are of particular importance in treating petroleum products) are as follows: (1) distillation in order to separate desired materials by boiling point; (2) separation procedures involving solvent extraction in which desired fractions are isolated based on differences in polarity and other physical characteristics; (3) crystallization in which selected compositions are separated from each other based on different solubility levels; and (4) chromatography which involves the separation of specific fractions using differences in the adsorption and charge characteristics of the materials being treated. All of these processes are discussed in *The Chemistry of Petroleum Hydrocarbons*, Chs. 7–10, pp. 103–274, Benjamin T. Brooks (ed.), Reinhold Publishing Corp., New York (1954) [which is again incorporated herein by reference]. Accordingly, many different methods may be used to separate desired fractions in the cracked hydrocarbon product 504, with the present invention not being limited to any particular separation techniques.

The present invention represents a significant advance in the art of hydrocarbon cracking technology. Many benefits are provided by the claimed process compared with prior methods including: (1) applicability to a wide variety of different petroleum and non-petroleum hydrocarbon compositions (e.g. heavy crude oil, refinery waste products, long chain organic molecules of biological origin, and the like); (2) the avoidance of metal catalytic agents and other comparable reagents; (3) the ability to process/crack hydrocarbon materials in the presence of heavy metals and/or sulfur without loss of system effectiveness; (4) the absence of large, complex, and energy-intensive processing equipment; (5) the ability to treat hydrocarbon materials in a rapid, continuous, and non-labor-intensive manner with a minimal degree of system maintenance; (6) a lack of chemical solvents and the costs/environmental controls associated therewith; and (7) the use of a processing system with a high degree of simplicity and a minimal number of components which facilitates on-site treatment of hydrocarbon materials at remote locations. In this regard, the claimed invention offers many advantages over previously-used cracking procedures.

Having herein described preferred embodiments of the present invention, it is anticipated that various modifications may be made thereto by individuals skilled in the art which nonetheless remain within the scope of the invention. For example, variations in the specific hardware and arrangement of operating components in the system of the present invention may be undertaken which shall nonetheless be encompassed with the broad concepts claimed in this case. Also, while the embodiments described above involve small-scale systems using a single pair of electrodes, the present invention shall likewise encompass large-scale systems having multiple pairs of electrodes in simultaneous operation. In this regard, the invention shall only be construed in accordance with the following claims:

I claim:

1. A method for cracking hydrocarbon compositions comprising the steps of:

providing a supply of a liquid hydrocarbon composition;

providing an elongate conductive primary electrode comprising a first end and a second end, and an elongate conductive secondary electrode comprising a first end and a second end;

positioning said first end of said primary electrode within said liquid hydrocarbon composition so that said first end of said primary electrode is entirely submerged within said hydrocarbon composition;

positioning said first end of said secondary electrode within said liquid hydrocarbon composition so that said first end of said secondary electrode is entirely submerged within said hydrocarbon composition, said first end of said secondary electrode being faced directly opposite to and spaced apart from said first end of said primary electrode in order to form a gap between said primary electrode and said secondary electrode;

applying an electrical potential to said primary electrode and said secondary electrode so that an electrical arc is generated within said gap between said first end of said primary electrode and said first end of said secondary electrode in said liquid hydrocarbon composition; and delivering at least one reactive gas to said electrical arc within said liquid hydrocarbon composition so that said gas comes in contact with said arc, said electrical potential applied to said primary electrode and said secondary electrode being sufficient to cause said gas to form a plasma bubble surrounding said arc, said plasma bubble cracking said hydrocarbon composition to produce a cracked hydrocarbon product.

2. The method of claim 1 wherein said reactive gas is selected from the group consisting of $CH_4$, $N_2$, $H_2$, $CO$, $CO_2$, $NH_3$, air, steam, $Br_2$, $Cl_2$, $F_2$, and mixtures thereof.

3. The method of claim 1 wherein said electrical potential applied to said primary electrode and said secondary electrode which is sufficient to form said plasma bubble has a voltage of about 0.5–15.0 kV AC and a current of about 100–500 mA AC.

4. The method of claim 1 wherein said electrical potential applied to said primary electrode and said secondary electrode which is sufficient to form said plasma bubble has a voltage of about 0.5–15.0 kV DC and a current of about 100–500 mA DC.

5. The method of claim 1 wherein said gap has a length of about 1–3 mm.

6. The method of claim 1 wherein said plasma bubble which surrounds said electrical arc has a volume of about 1–3 cc.

7. The method of claim 1 further comprising the step of maintaining said liquid hydrocarbon composition at an average temperature of about 70°–150° F. during said cracking thereof.

8. The method of claim 1 wherein each of said primary electrode and said secondary electrode is comprised of a material selected from the group consisting of Cu, W, Ni, Zr, Co and alloys thereof, a transition metal aluminide, a transition metal titanide, stainless steel, and brass.

9. The method of claim 1 wherein said delivering of said reactive gas to said electrical arc within said liquid hydrocarbon composition comprises introducing said gas into said hydrocarbon composition at a flow rate of about 0.05–1.0 liters/minute.

10. The method of claim 1 wherein said liquid hydrocarbon composition is comprised of crude oil.

11. A method for cracking hydrocarbon compositions comprising the steps of:

providing a containment vessel comprising a supply of a liquid hydrocarbon composition therein;

providing an elongate conductive primary electrode and an elongate conductive secondary electrode, said primary electrode comprising an open first end, an open second end, and a gas flow passageway extending continuously through said primary electrode from said first end to said second end, said secondary electrode comprising an open first end, an open second end, and a gas flow passageway extending continuously through said secondary electrode from said first end of said secondary electrode to said second end of said secondary electrode;

positioning said first end of said primary electrode within said liquid hydrocarbon composition so that said first end of said primary electrode is entirely submerged within said hydrocarbon composition inside said containment vessel with said second end of said primary electrode being positioned outside said containment vessel;

positioning said first end of said secondary electrode within said liquid hydrocarbon composition so that said first end of said secondary electrode is entirely submerged within said hydrocarbon composition inside said containment vessel with said second end of said secondary electrode being positioned outside said containment vessel, said first end of said secondary electrode being faced directly opposite to and spaced apart from said first end of said primary electrode in order to form a gap between said primary electrode and said secondary electrode;

applying an electrical potential to said primary electrode and said secondary electrode so that an electrical arc is generated within said gap between said first end of said primary electrode and said first end of said secondary electrode, said electrical arc being entirely submerged within said liquid hydrocarbon composition; and delivering at least one reactive gas into said passageway through said primary electrode and into said passageway through said secondary electrode, said gas passing out of said open first end of said primary electrode and out of said open first end of said secondary electrode, said gas thereafter coming in contact with said electrical arc within said liquid hydrocarbon composition, said electrical potential applied to said primary electrode and said secondary electrode being sufficient to cause said gas to form a plasma bubble surrounding said arc, said plasma bubble cracking said hydrocarbon composition to produce a cracked hydrocarbon product.

12. The method of claim 11 wherein said reactive gas is selected from the group consisting of $CH_4$, $N_2$, $H_2$, $CO$, $CO_2$, $NH_3$, air, steam, $Br_2$, $Cl_2$, $F_2$, and mixtures thereof.

13. The method of claim 11 wherein said electrical potential applied to said primary electrode and said secondary electrode which is sufficient to form said plasma bubble has a voltage of about 0.5–15.0 kV AC and a current of about 100–500 mA AC.

14. The method of claim 11 wherein said electrical potential applied to said primary electrode and said secondary electrode which is sufficient to form said plasma bubble has a voltage of about 0.5–15.0 kV DC and a current of about 100–500 mA DC.

15. The method of claim 11 wherein said gap has a length of about 1–3 mm.

16. The method of claim 11 wherein said plasma bubble which surrounds said electrical arc has a volume of about 1–3 cc.

17. The method of claim 11 further comprising the step of maintaining said liquid hydrocarbon composition at an average temperature of about 70°–150° F. during said cracking thereof.

18. The method of claim 11 wherein each of said primary electrode and said secondary electrode is comprised of a material selected from the group consisting of Cu, W, Ni, Zr, Co and alloys thereof, a transition metal aluminide, a transition metal titanide, stainless steel, and brass.

19. The method of claim 11 wherein said delivering of said reactive gas into said passageway through said primary electrode and into said passageway through said secondary electrode comprises introducing said gas into said primary electrode and said secondary electrode at a flow rate of about 0.05–1.0 liters/minute.

20. The method of claim 11 wherein said liquid hydrocarbon composition is comprised of crude oil.

* * * * *